US012602131B2

(12) United States Patent
Kim et al.

(10) Patent No.: US 12,602,131 B2
(45) Date of Patent: Apr. 14, 2026

(54) DISPLAY DEVICE AND DRIVING METHOD OF THE SAME

(71) Applicant: Samsung Display Co., LTD., Yongin-si (KR)

(72) Inventors: Ji Hoon Kim, Yongin-si (KR); Jang Hui Kim, Yongin-si (KR); Keum Dong Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/807,816

(22) Filed: Aug. 16, 2024

(65) Prior Publication Data

US 2025/0224834 A1     Jul. 10, 2025

(30) Foreign Application Priority Data

Jan. 9, 2024     (KR) ........................ 10-2024-0003541

(51) Int. Cl.
*G06F 3/041* (2006.01)
*G06F 3/044* (2006.01)

(52) U.S. Cl.
CPC .... *G06F 3/041662* (2019.05); *G06F 3/04162* (2019.05); *G06F 3/0441* (2019.05); *G06F 3/0446* (2019.05)

(58) Field of Classification Search
CPC ........... G06F 3/041662; G06F 3/04162; G06F 3/0441; G06F 3/0446
See application file for complete search history.

(56) References Cited

U.S. PATENT DOCUMENTS

| 9,696,861 | B2 | 7/2017 | Dinu et al. | |
|---|---|---|---|---|
| 2015/0338937 | A1* | 11/2015 | Shepelev | G06F 3/0442 |
| | | | | 345/179 |
| 2017/0003785 | A1* | 1/2017 | Berget | G06F 3/0445 |
| 2017/0179475 | A1* | 6/2017 | Lu | H01M 4/525 |
| 2019/0179475 | A1* | 6/2019 | Seo | G06F 3/0442 |
| 2020/0081552 | A1* | 3/2020 | Gur | G06F 3/0416 |
| 2020/0103993 | A1* | 4/2020 | Krah | G06F 3/04182 |
| 2020/0201505 | A1* | 6/2020 | Jung | G06F 3/0383 |
| 2021/0191571 | A1* | 6/2021 | Lee | G06F 3/04166 |
| 2023/0409143 | A1* | 12/2023 | Nomura | G06F 3/0446 |

FOREIGN PATENT DOCUMENTS

KR     20220088128 A  *  6/2022

* cited by examiner

*Primary Examiner* — Md Saiful A Siddiqui
(74) *Attorney, Agent, or Firm* — Womble Bond Dickinson (US) LLP

(57)     ABSTRACT

A display device includes a touch array including driving electrodes that extend in a first direction, and that are arranged in a second direction crossing the first direction, and sensing electrodes that extend in the second direction, and that are arranged in the first direction, and a touch driver configured to transmit uplink signals to an external device adjacent to the touch array through the driving electrodes and the sensing electrodes in a third sensing mode, and to sense a touch by applying a mutual driving signal to the touch array in a first sensing mode, the external device being configured to calculate position information using the uplink signals.

17 Claims, 21 Drawing Sheets

DISPLAY DEVICE AND DRIVING METHOD OF THE SAME

CROSS-REFERENCE TO RELATED APPLICATION

The present application claims priority to, and the benefit of, Korean patent application No. 10-2024-0003541 filed on Jan. 9, 2024, in the Korean Intellectual Property Office, the entire disclosure of which is incorporated herein by reference.

BACKGROUND

1. Field

The present disclosure generally relates to a display device, and a driving method of the same.

2. Related Art

Touch devices capable of indicating a position of a touch are widely used. For example, as mobile electronic devices, such as smartphones and tablet computers come into use, touch devices are widely used. Recently, demands for a technique for recognizing a touch on a touch panel, using not only a finger but also another tool, such as an active pen, has increased.

However, it may be difficult for electronic devices to efficiently provide, together, a touch of a finger or the like and a touch of an active pen while basically providing a display function. For example, as displays of the electronic devices become large in size and the speed of the electronic devices become high, sensing performance of recognizing a touch on a touch panel may be deteriorated, which may cause deterioration of the reliability of operations of touch devices, display devices, and electronic devices.

The above information disclosed in this Related Art section is only for enhancement of understanding of the background of the disclosure, and therefore it may contain information that does not form the prior art that is already known in this country to a person of ordinary skill in the art.

SUMMARY

Embodiments provide a display device capable of concurrently or substantially simultaneously sensing touches of a finger, an active pen, and the like with improved reliability, and a driving method of the display device.

In accordance with an aspect of the present disclosure, there is provided a display device including a touch array including driving electrodes that extend in a first direction, and that are arranged in a second direction crossing the first direction, and sensing electrodes that extend in the second direction, and that are arranged in the first direction, and a touch driver configured to transmit uplink signals to an external device adjacent to the touch array through the driving electrodes and the sensing electrodes in a third sensing mode, and to sense a touch by applying a mutual driving signal to the touch array in a first sensing mode, the external device being configured to calculate position information using the uplink signals.

A mutual capacitance may be formed between an adjacent pair of one of the driving electrodes and one of the sensing electrodes, wherein the touch driver is configured to apply the mutual driving signal to the driving electrodes in the first sensing mode, and is configured to sense a change in the mutual capacitance through a mutual sensing signal received from the sensing electrodes.

Self-capacitances may be respectively formed in the driving electrodes and the sensing electrodes, wherein the touch driver is configured to supply charges to the self-capacitances by applying a self-driving signal to the driving electrodes and the sensing electrodes in a second sensing mode, and is configured to sense a change in the self-capacitances.

A period in which the touch driver is configured to transmit the uplink signals in the third sensing mode, a period in which the touch driver is configured to sense a touch adjacent to the touch array in the first sensing mode, and a period in which the touch driver is configured to sense a touch adjacent to the touch array in the second sensing mode, may be different from one another.

In accordance with another aspect of the present disclosure, there is provided a method of driving a display device including a touch array including driving electrodes extending in a first direction and arranged in a second direction crossing the first direction, and sensing electrodes extending in the second direction and arranged in the first direction, the method including transmitting uplink signals to an external device adjacent to the touch array in a third sensing mode such that the external device calculates position information using the uplink signals, and sensing a touch adjacent to the touch array by applying a mutual driving signal to the touch array in a first sensing mode.

The method may further include forming a mutual capacitance between an adjacent pair of one of the driving electrodes and one of the sensing electrodes, wherein the sensing of the touch adjacent to the touch array in the first sensing mode includes applying the mutual driving signal to the driving electrodes, receiving a mutual sensing signal from the sensing electrodes, and sensing a change in the mutual capacitance through the mutual sensing signal.

The method may further include sensing a touch adjacent to the touch array by applying a self-driving signal to the driving electrodes and to the sensing electrodes in a second sensing mode.

The sensing of the touch adjacent to the touch array in the second sensing mode, the sensing of the touch adjacent to the touch array in the first sensing mode, and the transmitting of the uplink signals through the touch array in the third sensing mode may be sequentially performed.

The sensing of the touch adjacent to the touch array in the second sensing mode, the transmitting of the uplink signals through the touch array in the third sensing mode, and the sensing of the touch adjacent to the touch array in the first sensing mode may be sequentially performed.

The method may further include sensing of a touch adjacent to some areas of the touch array in the first sensing mode, and sensing of a touch adjacent to other areas of the touch array in the first sensing mode, wherein the sensing of the touch adjacent to the touch array in the second sensing mode, the sensing of the touch adjacent to the some areas of the touch array in the first sensing mode, the transmitting of the uplink signals through the touch array in the third sensing mode, and the sensing of the touch adjacent to the other areas of the touch array in the first sensing mode are sequentially performed.

In accordance with still another aspect of the present disclosure, there is provided a method of driving a display device including a touch array including dot electrodes arranged in a first direction and in a second direction crossing the first direction, and not overlapping each other, the method including transmitting uplink signals through the touch array in a third sensing mode such that an external device adjacent to the touch array is configured to calculate position information using the uplink signals, and sensing a touch adjacent to the touch array by applying a self-driving signal to the dot electrodes in a second sensing mode.

The method may further include forming a self-capacitance in the dot electrodes, wherein the sensing of the touch adjacent to the touch array in the second sensing mode includes supplying charges to the self-capacitance of the dot electrodes by applying the self-driving signal to the dot electrodes, and sensing a change in the self-capacitance of the dot electrodes.

The dot electrodes may include first to zth groups, z being a positive integer, wherein method further includes concurrently or substantially simultaneously transmitting the uplink signals through the dot electrodes of the first group in the third sensing mode, and sensing of a touch adjacent to dot electrodes of the second to zth groups in the second sensing mode.

The transmitting of the uplink signals through the dot electrodes of the first group in the third sensing mode may include separating the dot electrodes of the first group into row groups, sequentially transmitting the uplink signals for the row groups, separating the dot electrodes of the first group into column groups, and sequentially transmitting the uplink signals for the column groups.

The dot electrodes may include first to zth groups, z being a positive integer, wherein the method further includes sequentially transmitting the uplink signals through the dot electrodes of the first group in the third sensing mode, and sensing of a touch adjacent to dot electrodes of the second to zth groups in the second sensing mode.

The transmitting of the uplink signals through the dot electrodes of the first group in the third sensing mode may include separating the dot electrodes of the first group into row groups, sequentially transmitting the uplink signals for the row groups, separating the dot electrodes of the first group into column groups, and sequentially transmitting the uplink signals for the column groups.

The dot electrodes may include first to zth groups, z being a positive integer, wherein the method further includes sequentially sensing a touch adjacent to the dot electrodes of the second to zth groups in the second sensing mode, and transmitting the uplink signals through the dot electrodes of the first group in the third sensing mode.

The transmitting of the uplink signals through the dot electrodes of the first group in the third sensing mode may include separating the dot electrodes of the first group into row groups, sequentially transmitting the uplink signals for the row groups, separating the dot electrodes of the first group into column groups, and sequentially transmitting the uplink signals for the column groups.

The dot electrodes may include first to zth groups, z being a positive integer, wherein the method further includes sequentially sensing a touch adjacent to some of the dot electrodes of the second to zth groups in the second sensing mode, transmitting the uplink signals through the dot electrodes of the first group in the third sensing mode, and sensing of a touch adjacent to others of the dot electrodes of the second to zth groups in the second sensing mode.

The transmitting of the uplink signals through the dot electrodes of the first group in the third sensing mode may include separating the dot electrodes of the first group into row groups, sequentially transmitting the uplink signals for the row groups, separating the dot electrodes of the first group into column groups, and sequentially transmitting the uplink signals for the column groups.

BRIEF DESCRIPTION OF THE DRAWINGS

Example embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 is a block diagram illustrating a display device including a touch module in accordance with one or more embodiments of the present disclosure.

FIG. 2 is a block diagram illustrating a display device including a touch module in accordance with one or more other embodiments of the present disclosure.

FIG. 3 is a block diagram illustrating one or more embodiments of a display module shown in FIG. 1 or 2.

DETAILED DESCRIPTION

Figure 4:
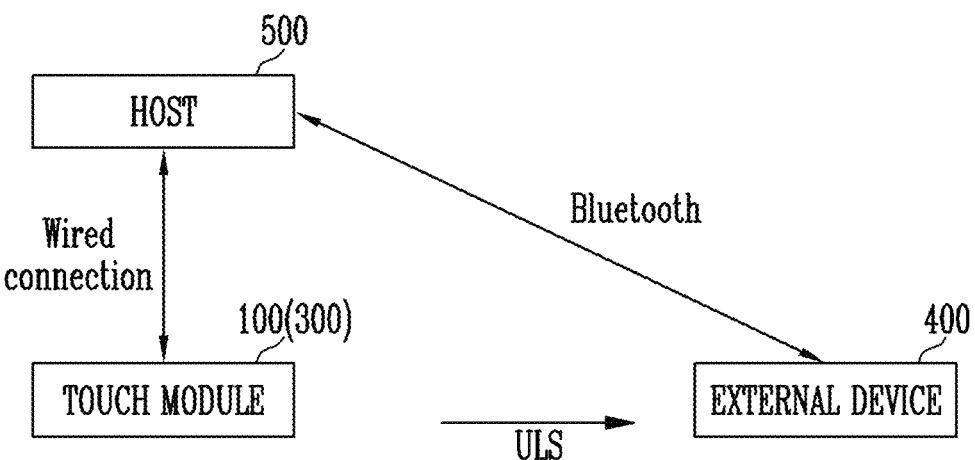
FIG. 4 is a block diagram schematically illustrating a third sensing mode of the display device shown in FIG. 1 or 2.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing one or more embodiments corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures.

It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions, such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions, such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
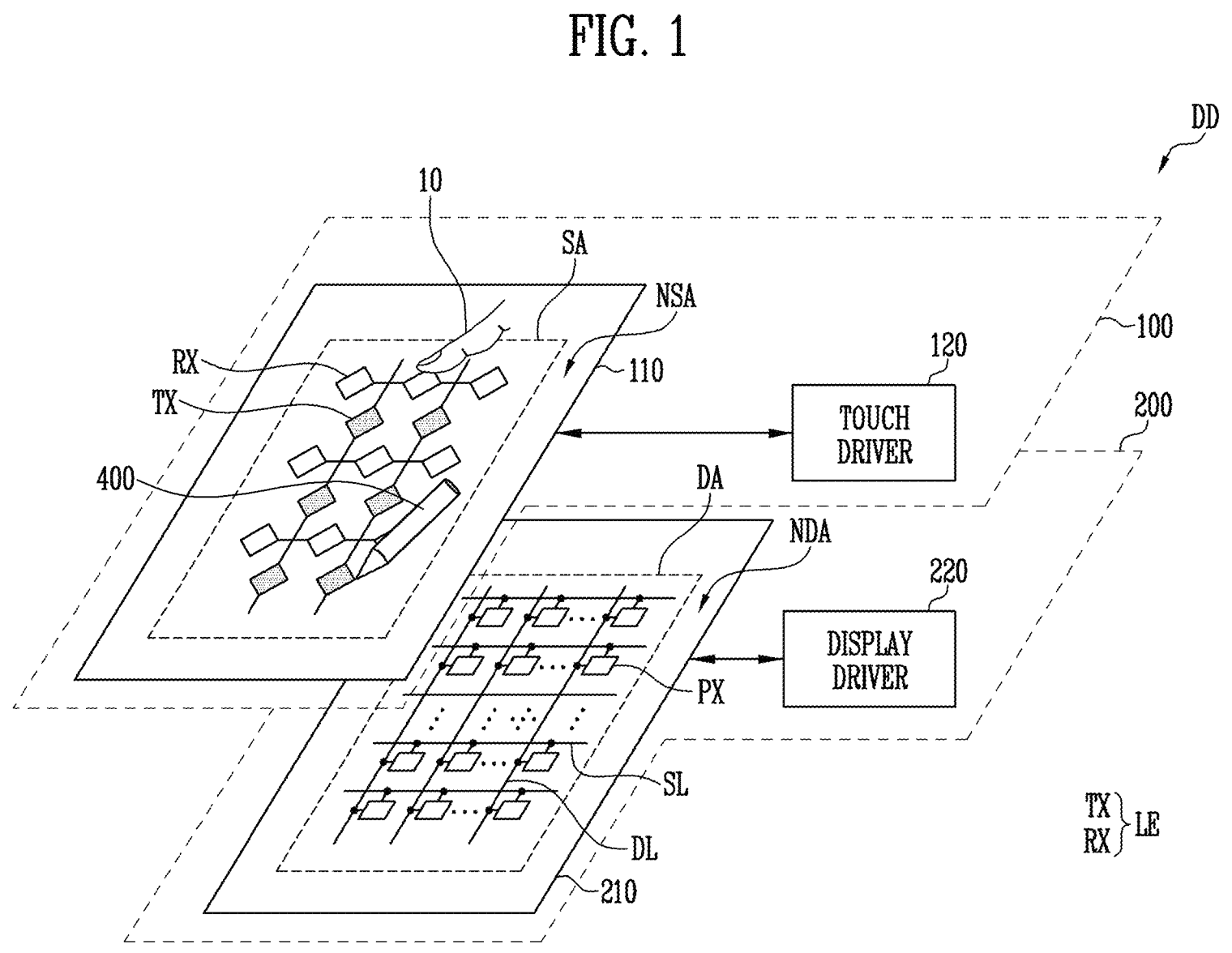

FIG. 1 is a block diagram illustrating a display device including a touch module in accordance with one or more embodiments of the present disclosure.

Referring to FIG. 1, the display device DD may include a touch module 100 and a display module 200.

The touch module 100 may include a touch array 110 and a touch driver 120 for driving the touch array 110, and the display module 200 may include a display panel 210 and a display driver 220 for driving the display panel 210.

In embodiments, the touch array 110 and the display panel 210 may be manufactured separately from each other and then coupled to each other to at least partially overlap with each other. In other embodiments, the touch array 110 and the display panel 210 may be integrally manufactured. The touch array 110 may be formed directly on at least one layer constituting the display panel 210 (e.g., an upper substrate), a thin film encapsulation layer, or an insulating layer of the display panel 210.

In FIG. 1, it is illustrated that the touch array 110 located on the display panel 210 (as used herein, "located on" or "formed on" may mean "above"). However, the touch array 110 is not limited thereto. For example, the touch array 110 may be located below the display panel 210.

The touch array 110 may include a sensing area SA capable of sensing a touch, and a non-sensing area NSA at the periphery of the sensing area SA. The sensing area SA may at least partially overlap with a display area DA. The display device DD may not only display an image through the sensing area SA, but also may sense a touch input made on a display surface, or may sense light incident at the front. The non-sensing area NSA may surround the sensing area SA (e.g., in plan view). However, this is merely illustrative, and the present disclosure is not limited thereto.

The touch array 110 may include a substrate, and driving electrodes TX and sensing electrodes RX (or line electrodes LE), which are formed on the substrate. The driving electrodes TX and the sensing electrodes RX (or the line electrodes LE) may be located in the sensing area SA on the substrate. In embodiments, the substrate may be a rigid substrate including a material, such as glass or tempered glass. In other embodiments, the substrate may be a flexible substrate including a material, such as plastic or metal. In embodiments, at least one layer constituting the display panel 210 may be used as the substrate of the touch array 110.

The display panel 210 may include the display area DA for displaying an image, and a non-display area NDA at the periphery of the display area DA. The non-display area NDA may at least partially surround the display area DA (e.g., in plan view). The display panel 210 may include pixels PX formed on a substrate. The pixels PX may be located in the display area DA. In embodiments, the substrate may be a rigid substrate including a material, such as glass or tempered glass. In other embodiments, the substrate may be a flexible substrate including a material, such as plastic or metal.

The pixels PX are connected to scan lines SL and data lines DL. The pixels PX are selected by a driving signal having a turn-on level supplied through the scan lines SL, and may receive data signals through the data lines DL. Accordingly, the pixels PX may emit lights with luminances corresponding to the data signals, and an image may be displayed in the display area.

Lines and/or a built-in circuit, connected to the pixels PX, may be located in the non-display area NDA. For example, a scan driver may be further located in the non-display area NDA.

In embodiments, the display panel 210 may include, as the pixels PX, organic light-emitting diodes, inorganic light-emitting diodes, quantum dot/well light-emitting diodes, and the like. In other embodiments, the display panel 210 may be implemented as a liquid crystal display panel. A light source, such as a backlight unit, may be additionally included.

In embodiments, the touch driver 120 and the display driver 220 may be configured as integrated chips (ICs) that are separate from each other. In other embodiments, the touch driver 120 and the display driver 220 may be mounted in one IC.

The display driver 220 may be electrically connected to the display panel 210 to drive the pixels PX. The display driver 220 and the display panel 210 will be described in detail with reference to FIG. 3.

The touch driver 120 may be connected to the touch array 110 to drive the touch array 110. The touch driver 120 may sense a touch of a finger 10 in a first sensing mode. The touch driver 120 may sense a touch of the finger 10 in a second sensing mode. The first sensing mode and the second sensing mode of the touch driver 120 will be described in detail with reference to FIGS. 7 to 9.

The touch driver 120 may transmit uplink signals toward an external device 400 in a third sensing mode. In addition, the external device 400 may receive uplink signals, and sense a touch of a user by calculating position information on the touch array 110, based on the uplink signals.

In an example, the display device DD may be employed in electronic devices, such as a computer, an laptop computer, a cellular phone, a smartphone, a Personal Digital Assistant (PDA), a Portable Multimedia Player (PMP), a digital TV, a digital camera, a portable game console, a navigation device, a wearable device, an Internet of Things (IoT) device, an Internet of Everything (IoE) device, an electronic book (e-book), a Virtual Reality (VR) device, an Augmented Reality (AR) device, a vehicle navigation system, a monitoring system, an autofocus system, a tracking system, and a motion detection system.

Figure 2:
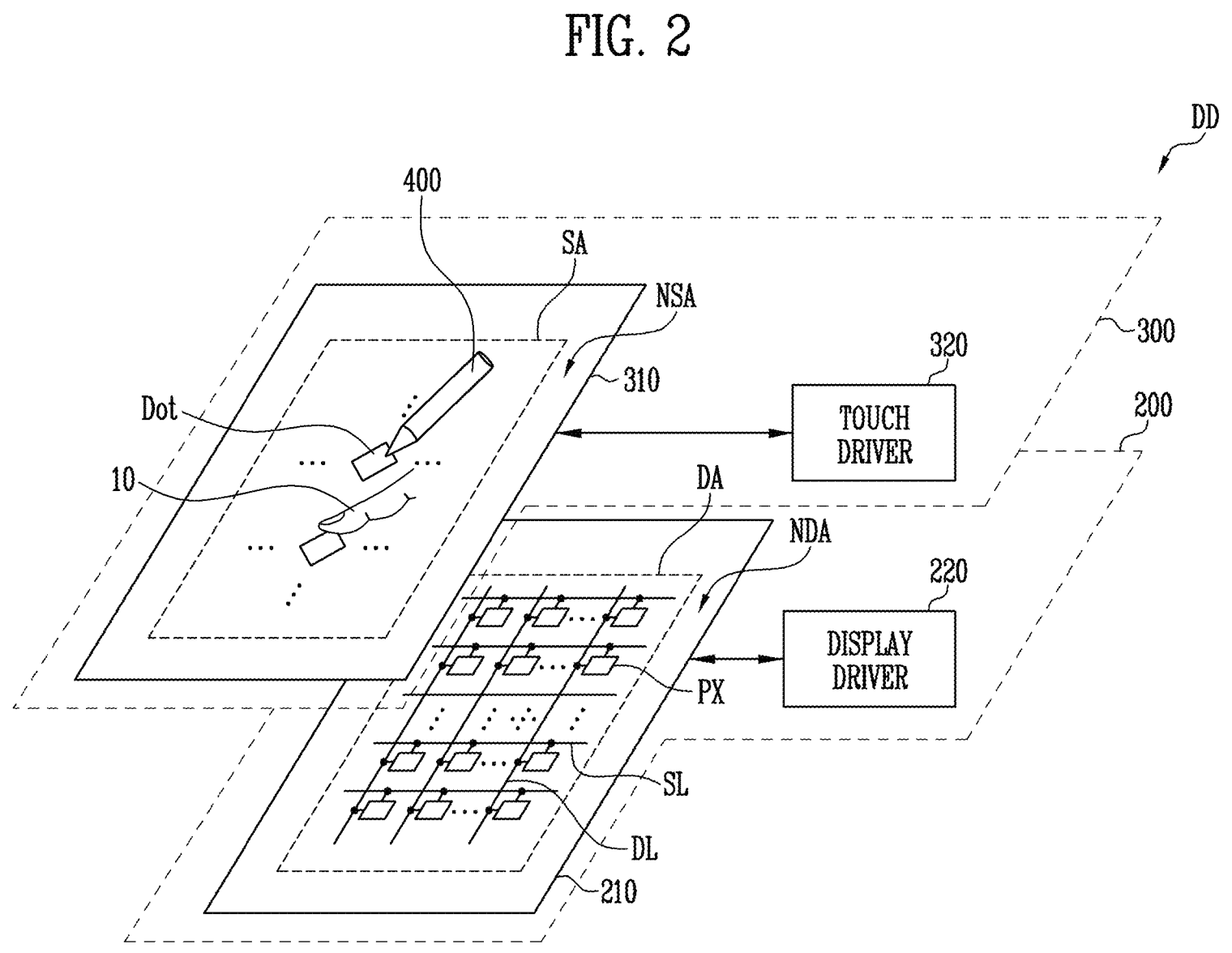

FIG. 2 is a block diagram illustrating a display device including a touch module in accordance with one or more other embodiments of the present disclosure.

Referring to FIG. 2, the display device DD may include a display module 200 and a touch module 300. In relation to the display module 200, descriptions of portions overlapping with those described with reference to FIG. 1 will be omitted.

The touch module 300 may include a touch array 310 and a touch driver 320 for driving the touch array 310.

The touch array 310 may include a sensing area SA capable of sensing a touch, and a non-sensing area NSA at the periphery of the sensing area SA. The sensing area SA may at least partially overlap with a display area DA. The display device DD may not only display an image through the sensing area SA, but also may sense a touch input made on a display surface, or may sense light incident at the front. The non-sensing area NSA may surround the sensing area SA. However, this is merely illustrative, and the present disclosure is not limited thereto.

The touch array 310 may include a substrate and dot electrodes Dot formed on the substrate. The dot electrodes Dot may be located in the sensing area SA on the substrate.

The touch driver 320 may be connected to the touch array 310 to drive the touch array 310. The touch driver 320 may sense a touch of a finger 10 in the second sensing mode. The second sensing mode of the touch driver 320 will be described in detail with reference to FIG. 10.

The touch driver 320 may transmit uplink signals toward an external device 400 in the third sensing mode. In addition, the external device 400 may receive uplink signals, and may sense a touch of a user by calculating position information on the touch array 310, based on the uplink signals.

Figure 3:
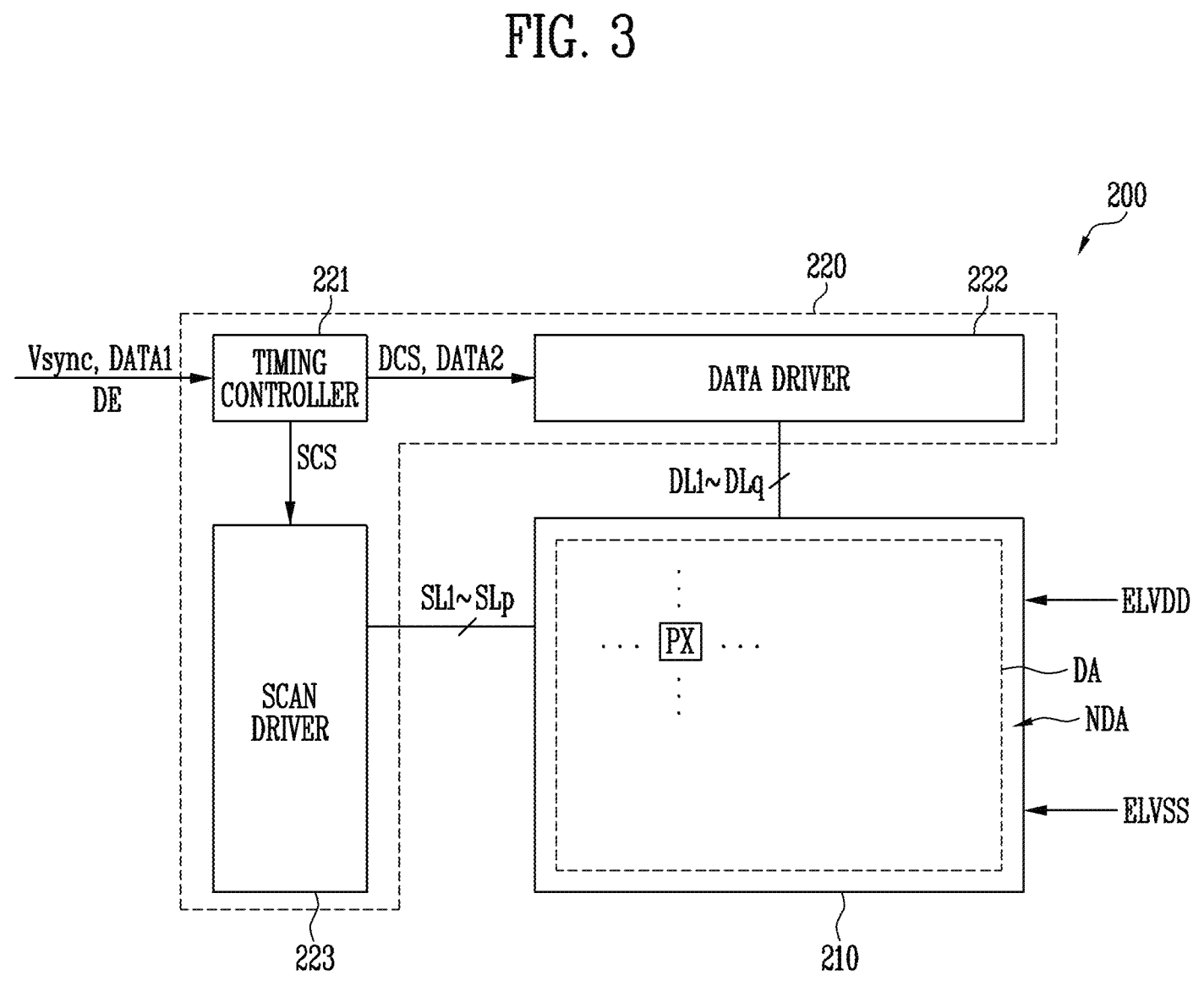

FIG. 3 is a block diagram illustrating one or more embodiments of the display module shown in FIG. 1 or 2.

Referring to FIG. 3, the display module 200 may include a display panel 210 and a display driver 220. In addition, the display driver 220 may include a timing controller 221, a data driver 222, and a scan driver 223.

The display module 200 may receive an external input signal provided from a host. The display module 200 may receive first image data DATA1 as the external input signal. In embodiments, the host may include an application processor, a Central Processing Unit (CPU), or the like, which controls the display module 200. In embodiments, the host may include a Graphic Processing Unit (GPU), which controls the display module 200. Besides, the host may include at least one of various devices that provide the first image data DATA1 to the display module 200.

The timing controller 221 may generate control signals for controlling the data driver 222 and the scan driver 223 using the external input signal. For example, the control signals may include a scan driver control signal SCS for controlling the scan driver 223, and a data driver control signal DCS for controlling the data driver 222. The external input signal may include a data enable signal DE and a vertical synchronization signal Vsync in addition to a signal including position information corresponding to the external device 400 on the touch array 110 shown in FIG. 1. For example, the vertical synchronization signal Vsync is a signal for synchronizing image data, and may be a signal input using one frame as a cycle, as a signal for distinguishing frames from each other. However, embodiments are not limited thereto. For example, the vertical synchronization signal Vsync may be internally generated in the timing controller 221. For example, the timing controller 221 may include a logic circuit that generates the vertical synchronization signal Vsync based on a signal, such as the data enable signal DE, which is received from the host.

In embodiments, the vertical synchronization signal Vsync may be provided to the touch driver 120 shown in FIG. 1. The vertical synchronization signal Vsync may be provided to the touch driver 320 shown in FIG. 2. The touch driver 120 or 320 may generate uplink signals ULS (see FIG. 4) in synchronization with the vertical synchronization signal Vsync.

The timing controller 221 may supply the scan driver control signal SCS to the scan driver 223, and may supply the data driver control signal DCS to the data driver 222. Also, the timing controller 221 may convert the first image data input from the outside into second image data DATA2 suitable for specifications of the data driver 222, and may supply the second image data DATA2 to the data driver 222.

In accordance with one or more embodiments, the display panel 210 may include pixels PX, and data lines DL1 to DLq and scan lines SL1 to SLp, which are connected to the pixels PX.

The data driver 222 may receive the data driver signal DCS and the second image data DATA2, which are input from the timing controller 221, to generate a data signal. Also, the data driver 222 may supply the generated data signal to the data lines DL1 to DLq. For connection to the data lines DL1 to DLq, the data driver 222 may be mounted directly on a substrate on which the pixels PX are formed, or may be connected to the substrate through a separate component, such as a flexible circuit board.

The scan driver 223 may supply scan signals to the scan lines SL1 to SLp in response to the scan driver control signal SCS. For example, the scan driver 223 may sequentially supply the scan signals to the scan lines SL1 to SLp. For connection to the scan lines SL1 to SLp, the scan driver 223 may be mounted directly on the substrate on which the pixels PX are formed, or may be connected to the substrate through a separate component, such as a flexible circuit board.

For example, when a scan signal is supplied to a corresponding scan line, some pixels PX connected to the corresponding scan line may be supplied with a data signal transferred from the data line DL1 to DLq. Such pixels PX may emit light with a luminance corresponding to the supplied data signal.

In FIG. 2, it is illustrated that the timing controller 221, the data driver 222, and the scan driver 223 are separate from one another. However, at least some of the components may be integrated, if necessary.

An electrode to which a voltage and/or a signal, which may be used to drive the display panel 210, are supplied may be referred to as a panel electrode. The panel electrode may correspond to the data lines DL1 to DLq, the scan lines SL1 to SLp, a first power source ELVDD, a second power source ELVSS, or the like. A driving voltage may be supplied to the panel electrode. For example, each of the pixels PX may generate light with a luminance corresponding to a data signal according to a current flowing from the first power source ELVDD to the second power source ELVSS via a light-emitting element. The first power source ELVDD may be a high-potential voltage, and the second power source ELVSS may be a low-potential voltage.

FIG. 4 is a block diagram schematically illustrating the third sensing mode of the display device shown in FIG. 1 or 2.

Referring to FIGS. 1, 2, and 4, the touch module 100 may include a touch array 110 and a touch driver 120. The touch module 300 may include a touch array 310 and a touch driver 320.

The touch driver 120 may generate uplink signals by applying touch-driving signals to the touch array 110. The touch driver 120 may transmit the generated uplink signals ULS to the external device 400 (e.g., by using capacitive coupling) through driving electrodes TX and sensing electrodes RX (or line electrodes LE), which are located in the touch array 110. As such, the uplink signals ULS may be transferred to the external device 400 through a capacitor formed between the line electrodes LE of the touch array 110 and the external device 400. For example, the uplink signals ULS may include position information corresponding to the touch-driving signals, information of the touch array 110, protocol information, and the like.

Similarly, the touch driver 320 may generate uplink signals ULS by applying touch-driving signals to the touch array 310. The touch driver 320 may transmit the generated uplink signals ULS to the external device 400 (e.g., by using capacitive coupling) through a plurality of dot electrodes Dot located in the touch array 310. As such, the uplink signals ULS may be transferred to the external device 400 through a capacitor formed between the dot electrodes Dot of the touch array 310 and the external device 400. The uplink signals ULS may include position information corresponding to the touch-driving signals, information of the touch array 310, protocol information, and the like.

A host 500 may include an internal memory, at least one processor, and an interface. The host 500 may perform several functions for the touch module 100 or 300 by executing several software programs through the processor, and may perform processing and control for data communication. Also, the host 500 may perform communication with an arbitrary external device and/or an arbitrary system through various types of interfaces. For example, the host

500 may be a separate computing device connected to the touch module 100 or 300 through communication.

The host 500 may perform communication with the external device 400. For example, the host 500 may include a transmission device that performs serial communication for direct connection, such as a serial bus (I2C), a Universal Serial Bus (USB), a Serial Peripheral Interface (SPI) or RS-232, and/or that performs wireless communication for indirect connection, such as Bluetooth (low power Bluetooth), Wi-Fi Direct, IrDA LAN or WAN (Bluetooth® being a registered trademark of Bluetooth Sig, Inc., Kirkland, WA, and Wi-Fi Direct® are registered trademarks of the non-profit Wi-Fi Alliance).

Also, the host 500 may perform communication with the external device 400 or the touch module (100 or 300) through the transmission device. For example, the host 500 may transmit, to the touch module 100 or 300, position information corresponding to the external device, which is received from the external device 400 through Bluetooth communication, through serial communication (Bluetooth® being a registered trademark of Bluetooth Sig, Inc., Kirkland, WA).

As shown in FIG. 4, the touch module 100 or 300 may transmit uplink signals ULS to the external device 400 in the third sensing mode, and the external device 400 may receive the uplink signals ULS. In addition, the external device 400 may calculate position information corresponding to the external device by using the uplink signals ULS. The external device 400 may transmit, to the host 500, the calculated position information corresponding to the external device through the Bluetooth communication (Bluetooth® being a registered trademark of Bluetooth Sig, Inc., Kirkland, WA).

Figure 5:
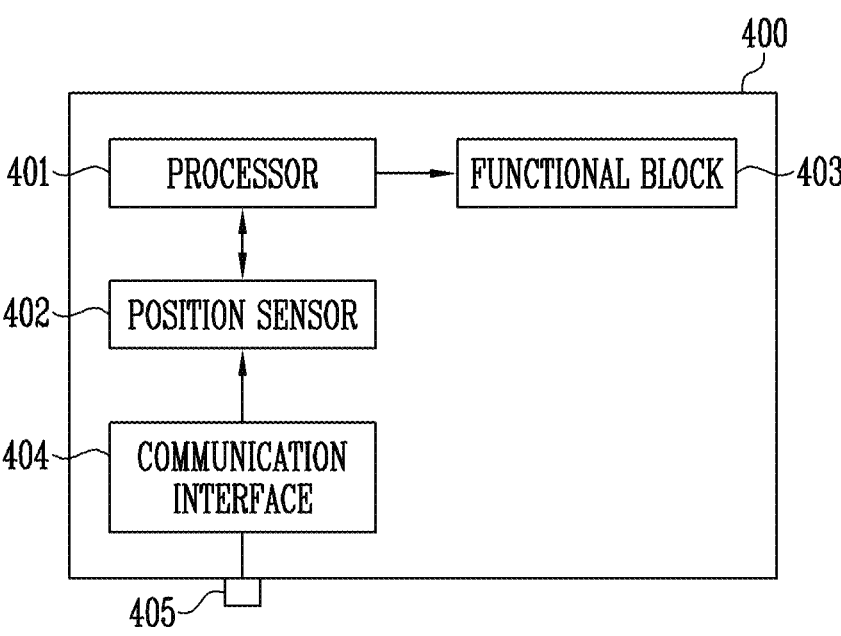
FIG. 5 is a block diagram illustrating one or more embodiments of an external device shown in FIG. 4.

FIG. 5 is a block diagram illustrating one or more embodiments of the external device shown in FIG. 4.

Referring to FIG. 5, the external device 400 may include a processor 401, a position sensor 402, a functional block 403, a communication interface 404, and a receiving electrode 405.

In embodiments, the external device 400 may be an external device including an active pen, a robot, various types of accessories, a game card, and the like.

The processor 401 may be configured to control overall operations of the external device 400. For example, the processor 401 may control the position sensor 402. The processor 401 may control an operation of the position sensor 402 by transmitting a position sensor control signal to the position sensor 402. In addition, the position sensor 402 may calculate position information corresponding to the external device 400 by decoding uplink signals received from the communication interface 404.

The processor 401 may receive position information from the position sensor 402, and may transmit the received position information to the functional block 403. The functional block 403 may perform several functions, using the received position information. For example, the functional block 403 may include a motor for moving the external device 400 in a corresponding direction. The functional block 403 may move the external device 400 by driving the motor according to the received position information.

In embodiments, the processor 401 may control the position sensor 402 and the communication interface 404 to transmit position information to the touch module 100 or 300 (see FIG. 4). The position sensor 402 may encode position information corresponding to the external device 400, and may provide the encoded position information to the communication interface 404. The communication interface 404 may perform wireless communication for indirect connection, such as Bluetooth (low power Bluetooth), Wi-Fi direct, IrDA LAN or WAN (Bluetooth® being a registered trademark of Bluetooth Sig, Inc., Kirkland, WA, and Wi-Fi Direct® are registered trademarks of the non-profit Wi-Fi Alliance). The communication interface 404 may transmit, to the host 500 (see FIG. 4), a data signal obtained by encoding the position information.

The receiving electrode 405 of the external device 400 may be connected to the communication interface 404. When the receiving electrode 405 is adjacent to the touch array 110, a relatively low capacitor may be formed between the receiving electrode 405 and at least some of the driving electrodes TX and the sensing electrodes RX (or the line electrodes LE). The external device 400 may communicate uplink signals with the corresponding driving electrodes and/or the corresponding sensing electrodes through the relatively low capacitor.

Similarly, when the receiving electrode 405 is adjacent to the touch array 310, a relatively low capacitor may be formed between the receiving electrode 405 and at least some of the dot electrodes Dot. The external device 400 may communicate uplink signals with the corresponding dot electrodes Dot through the relatively low capacitor.

The communication interface 404 may amplify a received signal. For example, in a process of receiving uplink signals, the communication interface 404 may amplify the received signals through the receiving electrode 405.

The communication interface 404 may configured to convert an analog signal into a digital signal and convert a digital signal into an analog signal. For example, the communication interface 404 may convert the uplink signals received through the receiving electrode 405 into digital signals, and may provide the converted digital signals to the position sensor 402.

Figure 6:
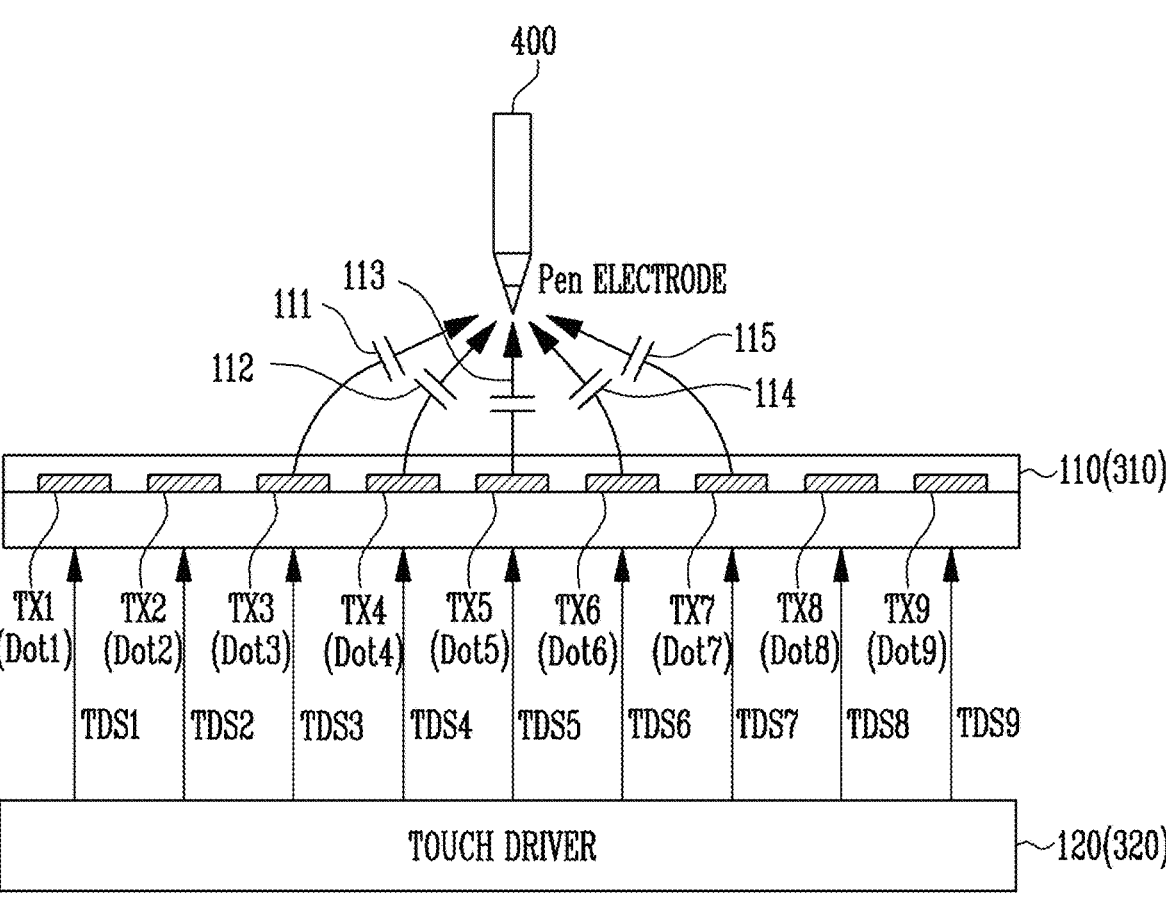
FIG. 6 a diagram illustrating uplink signals received to the external device shown in FIG. 4.

FIG. 6 a diagram illustrating uplink signals received to the external device shown in FIG. 4.

Referring to FIG. 6, an operation may be described, in which the external device 400 receives uplink signals through capacitors generated between the external device 400 and adjacent line electrodes LE (see FIG. 1). In addition, an operation may be described, in which the external device 400 receives uplink signals through capacitors generated between the external device 400 and adjacent dot electrodes Dot (see FIG. 2). In FIG. 6, it is illustrated that the external device 400 is an active pen. However, the present disclosure is not limited thereto.

As shown in FIG. 6, the touch driver 120 may apply touch-driving signals TDS1, TDS2, TDS3, TDS4, TDS5, TDS6, TDS7, TDS8, and TDS9 including different codes respectively to first to ninth driving electrodes TX1, TX2, TX3, TX4, TX5, TX6, TX7, TX8, and TX9 of the touch array 110. In addition, when the external device 400 is adjacent to the touch array 110, the external device 400 may receive uplink signals through capacitors 111, 112, 113, 114, and 115 generated between the external device 400 and the third to seventh driving electrodes TX3, TX4, TX5, TX6, and TX7 adjacent thereto.

Similarly, as shown in FIG. 6, the touch driver 320 may apply touch-driving signals TDS1, TDS2, TDS3, TDS4, TDS5, TDS6, TDS7, TDS8, and TDS9 including different codes respectively corresponding to first to ninth dot electrodes Dot1, Dot2, Dot3, Dot4, Dot5, Dot6, Dot7, Dot8, and Dot9 of the touch array 310. In addition, when the external device 400 is adjacent to the touch array 310, the external device 400 may receive uplink signals through the capacitors 111, 112, 113, 114, and 115 generated between the external device 400 and the third to seventh dot electrodes Dot3, Dot4, Dot5, Dot6, and Dot7 adjacent thereto.

The uplink signals may include digital components representing different codes and analog components of capacitors generated between touch electrodes and an object. For example, a digital component according to a corresponding touch-driving signal and an analog component according to a corresponding capacitor may be included in each of the uplink signals transmitted from the third to seventh driving electrodes TX3, TX4, TX5, TX6, and TX7. For example, a digital component according to a corresponding touch-driving signal and an analog component according to a corresponding capacitor may be included in each of the uplink signals transmitted from the third to seventh dot electrodes Dot3, Dot4, Dot5, Dot6, and Dot7.

The external device 400 may calculate position information corresponding to the external device 400 and based on the uplink signals received from the touch electrodes (e.g., the third to seventh driving electrodes TX3, TX4, TX5, TX6, and TX7 and/or the third to seventh dot electrodes Dot3, Dot4, Dot5, Dot6, and Dot7). For example, the external device 400 may determine a weighted value of each of the uplink signals, based on analog components according to the capacitors 111, 112, 113, 114, and 115, and may apply the determined weighted value to each of the uplink signals. Also, the external device 400 may decode the uplink signals to which the weighted values are applied and/or digital components thereof, thereby calculating position information corresponding to the external device 400. An algorithm (e.g., a predetermined algorithm) may be applied such that the uplink signals and/or the digital components thereof are decoded. As such, the external device 400 may determine position information of the external device 400 based on uplink signals received from at least one touch electrode adjacent to the external device 400.

In FIG. 6, for convenience of description, the first to ninth driving electrodes TX1, TX2, TX3, TX4, TX5, TX6, TX7, TX8, and TX9 as a portion of the touch array 110 shown in FIG. 1 are illustrated, and the other driving electrodes are omitted. However, this is merely for convenience of description, and a case where uplink signals are transmitted through the other driving electrodes may also be equally described.

In FIG. 6, for convenience of description, the first to ninth dot electrodes Dot1, Dot2, Dot3, Dot4, Dot5, Dot6, Dot7, Dot8, and Dot9 as a portion of the touch array 310 shown in FIG. 2 are illustrated, and the other dot electrodes are omitted. However, this is merely for convenience of description, and a case where uplink signals are transmitted through the other dot electrodes may also be equally described.

Figure 7:
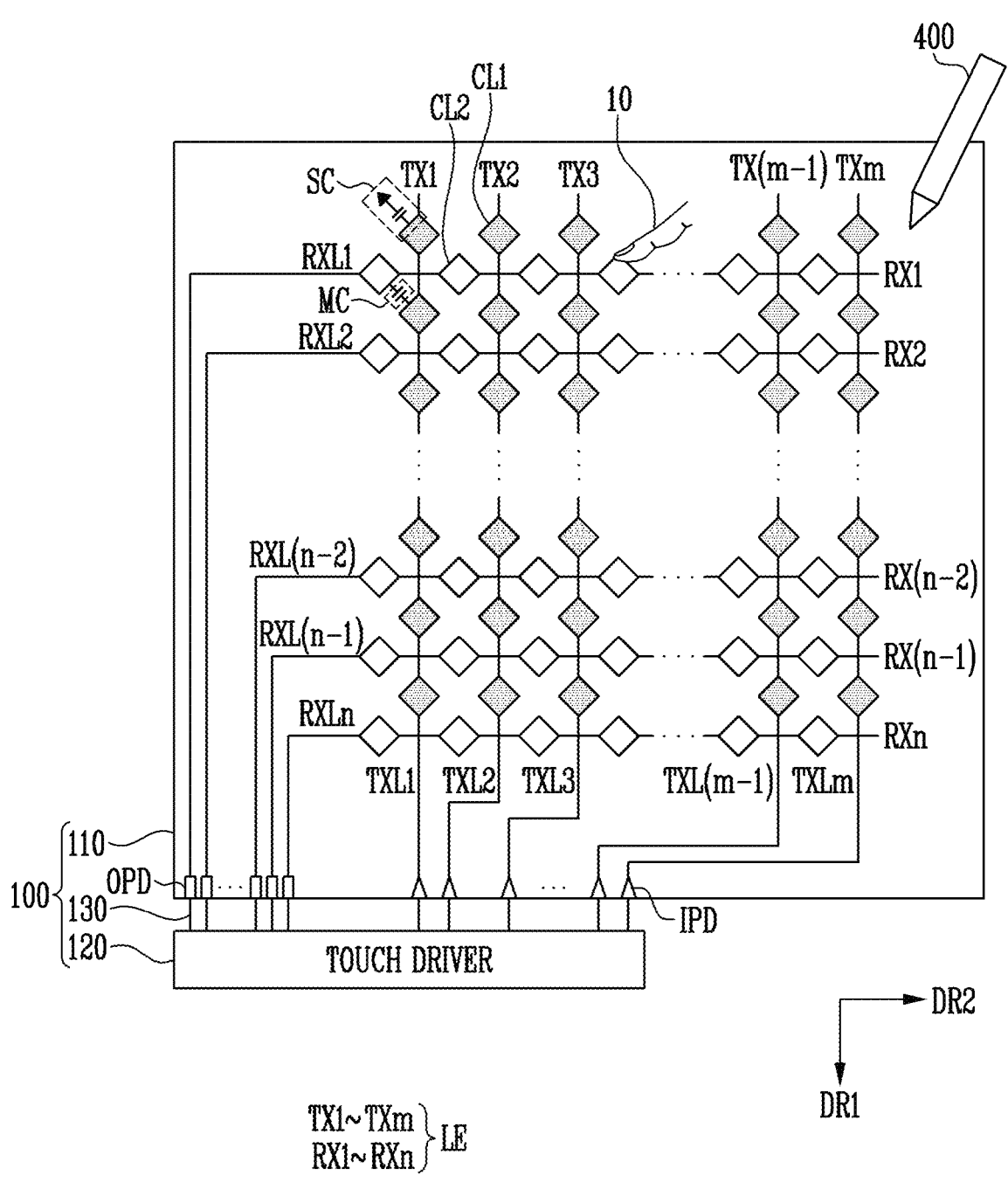
FIG. 7 is a diagram illustrating one or more embodiments of the touch module shown in FIG. 1.

FIG. 7 is a diagram illustrating one or more embodiments of the touch module shown in FIG. 1.

Referring to FIG. 7, the touch module 100 may include a touch array 110, a touch driver 120, and connection lines 130.

The touch array 110 may include line electrodes LE. The line electrodes LE of the touch array 110 may be configured with first to mth driving electrodes TX1 to TXm and first to nth sensing electrodes RX1 to RXn.

The first to mth driving electrodes TX1 to TXm may extend in a first direction DR1, and may be spaced apart from each other in a second direction DR2. The first to nth sensing electrodes RX1 to RXn may extend in the second direction DR2, and may be spaced apart from each other in the first direction DR1. As shown in FIG. 7, the first to mth driving electrodes TX1 to TXm and the first to nth sensing electrodes RX1 to RXn may overlap with each other while crossing each other.

The first to nth sensing electrodes RX1 to RXn may be electrically separated from each other while crossing the first to mth driving electrodes TX1 to TXm to form mutual capacitances MC with the first to mth driving electrodes TX1 to TXm.

A self-capacitance SC may be formed in each of the first to mth driving electrodes TX1 to TXm. A self-capacitance SC may be formed in each of the first to nth sensing electrodes.

The mutual capacitance MC and the self-capacitance SC may be changed when a touch of a user is provided to the touch array 110. For example, when a touch of the finger 10 is provided to the touch array 110, the mutual capacitance MC and the self-capacitance SC may be changed.

The first to mth driving electrodes TX1 to TXm may be connected to the first to mth driving lines TXL1 to TXLm, respectively. The first to nth sensing electrodes RX1 to RXn may be connected to first to nth sensing lines RXL1 to RXLn. The first to mth driving electrodes TX1 to TXm may be provided as the driving electrodes TX shown in FIG. 1, and the first to nth sensing electrodes RX1 to RXn may be provided as the sensing electrodes RX shown in FIG. 1.

Each of the first to mth driving electrodes TX1 to TXm may include first cells CL1 that are arranged in the first direction DR1, and that are electrically connected to each other. Each of the first to nth driving electrodes RX1 to RXn may include second cells CL2 that are arranged in the second direction DR2, and that are electrically connected to each other. In FIG. 7, it may be illustrated that each of the first cells CL1 and the second cells CL2 has a diamond shape. However, the diamond shape is merely described as an example, and may be at least one of various shapes, such as a circular shape, a quadrangular shape, or a mesh shape. Also, each of the first cells CL1 and the second cells CL2 may be formed as a single layer or a multi-layer. As such, the shapes and arrangements of the first to mth driving electrodes TX1 to TXm and the first to nth sensing electrodes RX1 to RXn may be variously modified.

In embodiments, the first cells CL1 and the second cells CL2 may include at least one of various conductive materials, such as a metal material or a transparent conductive material, thereby having conductivity. For example, each of the first cells CL1 and the second cells CL2 may include at least one of various metal materials, such as gold (Au), silver (Ag), aluminum (Al), molybdenum (Mo), chromium (Cr), titanium (Ti), nickel (Ni), neodymium (Nd), copper (Cu), or platinum (Pt), or alloys thereof.

The touch array 110 may be provided as the touch array 110 shown in FIG. 1. The touch array 110 may further include input pads IPD connected to the first to mth driving lines TXL1 to TXLm. Also, the touch array 110 may further include output pads OPD connected to the first to nth sensing lines RXL1 to RXLn.

The connection lines 130 may extend in the first direction DR1, and may be spaced apart from each other. The touch driver 120 may be connected to the input pads IPD and the output pads OPD through the connection lines 130.

The touch module 100 may transmit uplink signals to the external device 400 through the first to mth driving electrodes TX1 to TXm and the first to nth sensing electrodes RX1 to RXn in the third sensing mode. For example, the touch driver 120 may transmit uplink signals to the external device 400 by applying touch-driving signals to the first to mth driving electrodes TX1 to TXm through the first to mth driving lines TXL1 to TXLm. Also, the touch driver 120 may transmit uplink signals to the external device 400 by applying touch-driving signals to the first to nth sensing electrodes RX1 to RXn through the first to nth sensing lines RXL1 to RXLn.

When the external device 400 is in contact with or adjacent to the touch array 110, the external device 400 may receive uplink signals ULS through at least some of the first to mth driving electrodes TX1 to TXm and the first to nth sensing electrodes RX1 to RXn. Also, the external device 400 may calculate position information corresponding to the external device 400 on the touch array 110 by decoding the received uplink signals ULS.

Figure 8:
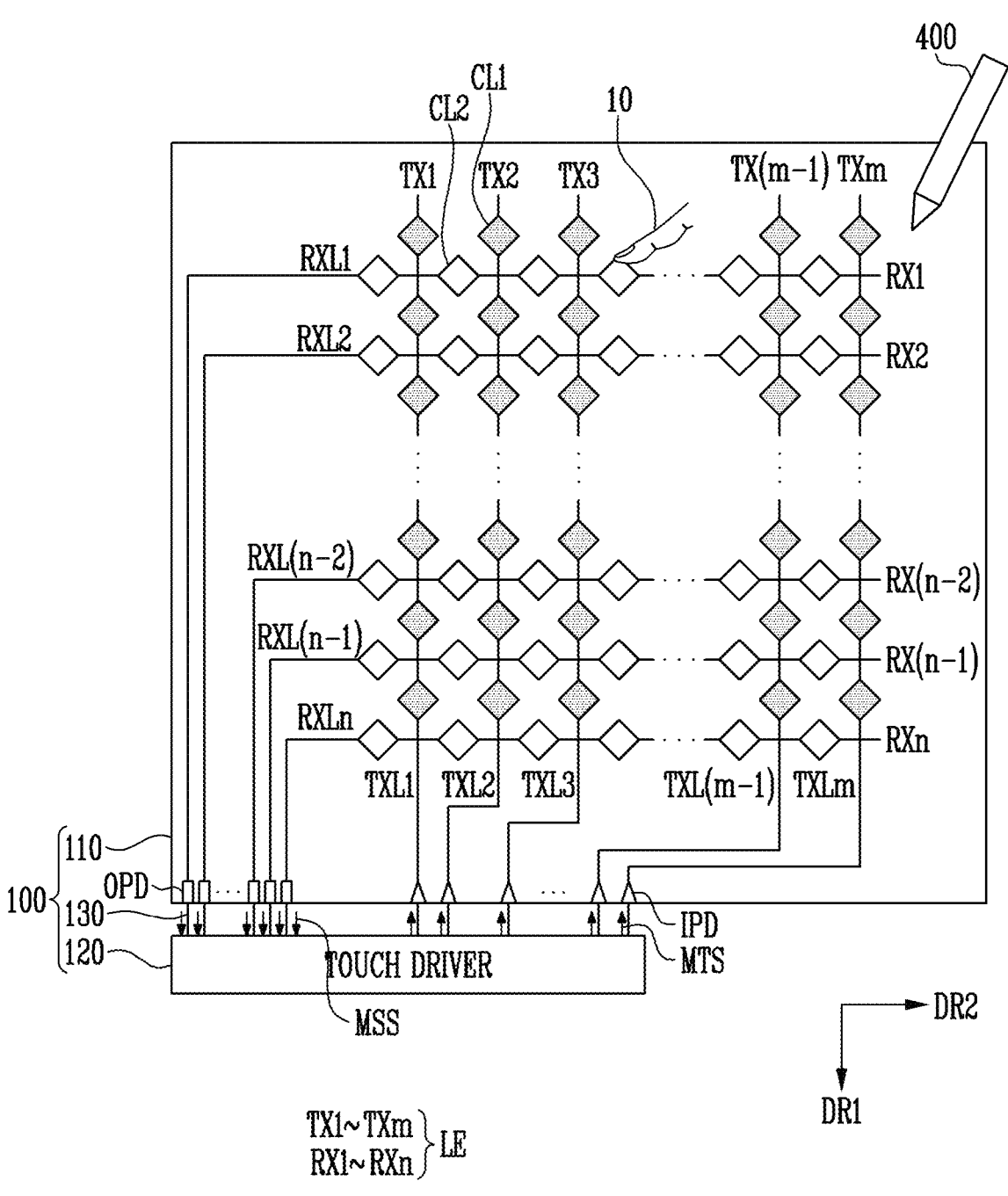
FIG. 8 is a diagram illustrating a first sensing mode of the touch module shown in FIG. 7.

FIG. 8 is a diagram illustrating the first sensing mode of the touch module shown in FIG. 7.

Referring to FIGS. 7 and 8, the touch driver 120 may supply a mutual driving signal MTS to the input pads IPD through some of the connection lines 130 in the first sensing mode. The mutual driving signal MTS may be supplied to the driving electrodes TX1 to TXm via the input pads IPD.

When a touch of the finger 10 is provided to the touch array 110, one or more of mutual capacitances MC may be changed.

The touch driver 120 may sense a mutual sensing signal MSS from the first to nth sensing electrodes RX1 to RXn through the first to nth sensing lines RXL1 to RXLn. The touch driver 120 may sense a change in mutual capacitance MC based on the mutual sensing signal MSS. The touch driver 120 may recognize a touch by sensing the change in mutual capacitance MC.

In some embodiments, the touch driver 120 may supply the mutual driving signal MTS to only some driving electrodes among the driving electrodes TX1 to TXm in the first sensing mode. The touch driver 120 may sense only a change in mutual capacitances MC at the periphery of the some driving electrodes to which the mutual driving signal MTS is supplied. Accordingly, the touch driver 120 may sense only a touch adjacent to some line electrodes among the line electrodes LE.

Figure 9:
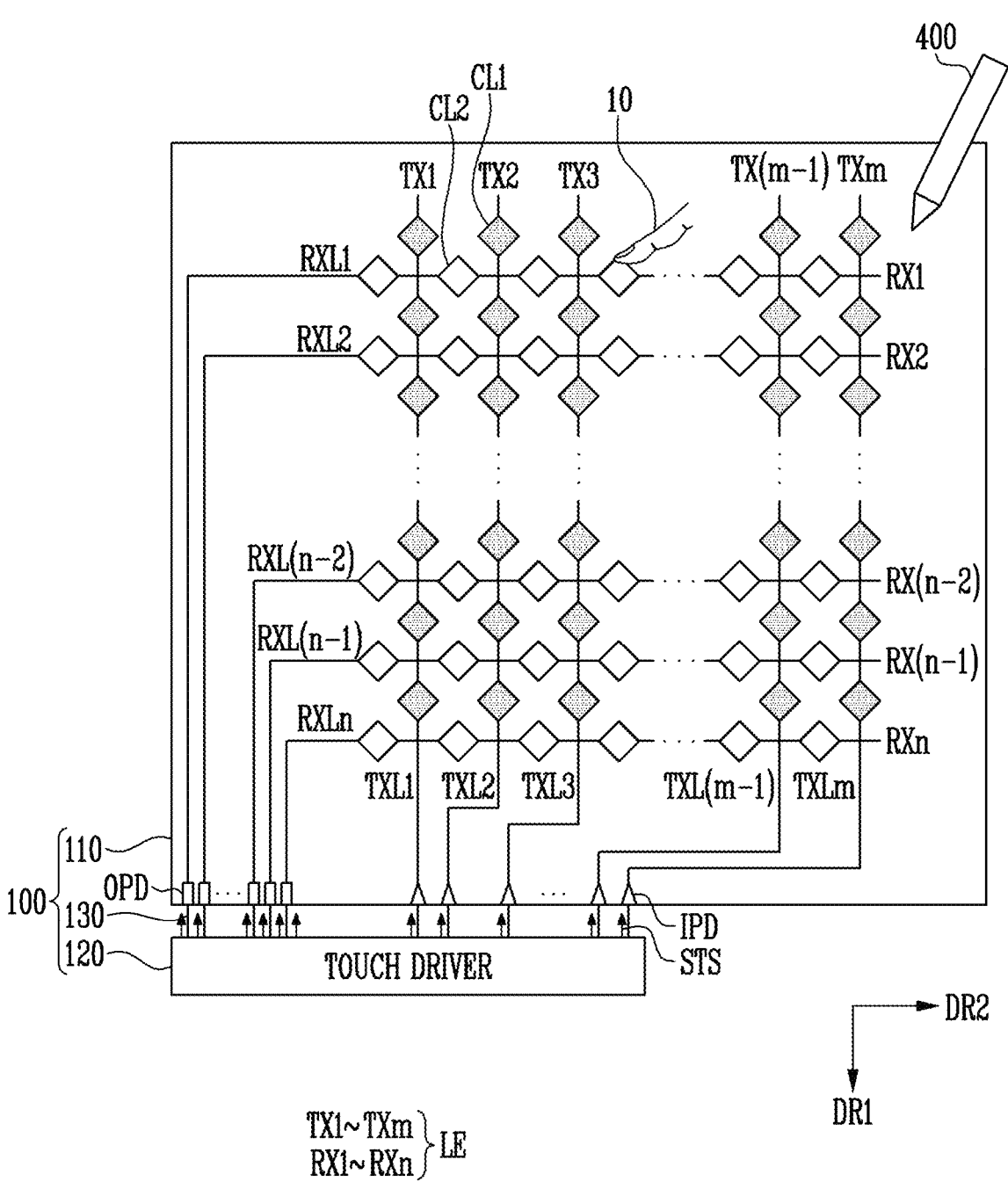
FIG. 9 is a diagram illustrating a second sensing mode of the touch module shown in FIG. 7.

FIG. 9 is a diagram illustrating the second sensing mode of the touch module shown in FIG. 7.

Referring to FIGS. 7 and 9, the touch driver 120 may supply a self-driving signal STS to all of the driving electrodes TX1 to TXm and the sensing electrodes RX1 to RXn through the connection lines 130 in the second sensing mode. The supplied self-driving signal STS may supply charges to a self-capacitance SC formed in each of the driving electrodes TX1 to TXm and the sensing electrodes RX1 to RXn.

When a touch of the finger 10 is provided to the touch array 110, one or more of self-capacitances may be changed.

The touch driver 120 may sense a touch by sensing a change in self-capacitance formed in each of the driving electrodes TX1 to TXm and the sensing electrodes RX1 to RXn.

Figure 10:
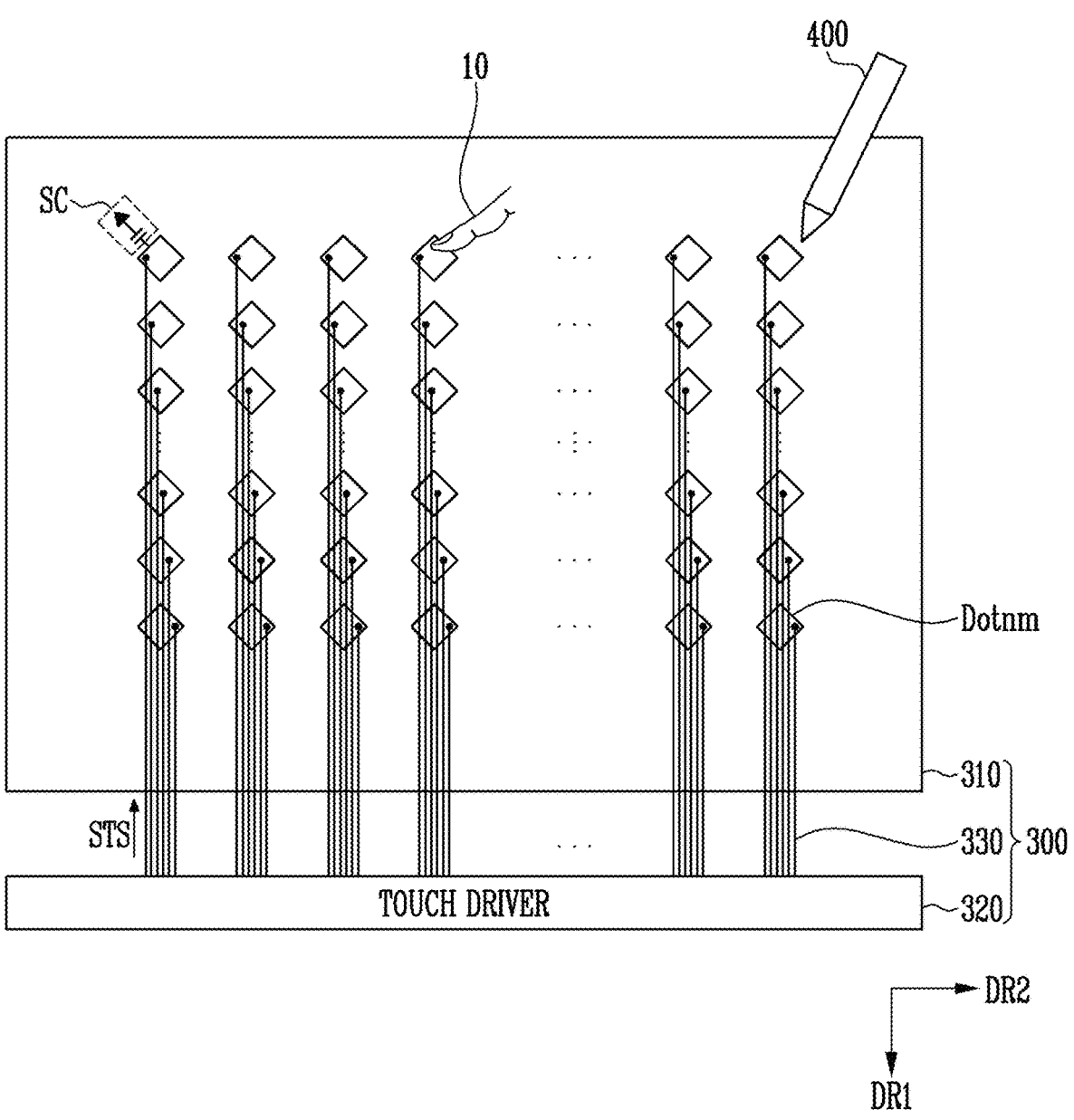
FIG. 10 is a block diagram illustrating one or more embodiments of the touch module shown in FIG. 2.

FIG. 10 is a block diagram illustrating one or more embodiments of the touch module shown in FIG. 2.

Referring to FIG. 10, the touch module 300 may include a touch array 310, a touch driver 320, and connection lines 330.

The touch array 310 may include a plurality of dot electrodes Dot arranged in the first direction DR1 and the second direction DR2. As shown in FIG. 10, the plurality of dot electrodes Dot may be arranged in n rows in the first direction DR1 and m columns in the second direction. The touch array 310 may include a dot electrode Dotnm located on an nth row and an mth column.

Unlike the line electrodes LE shown in FIG. 7, the plurality of dot electrodes Dot might not overlap with each other.

A self-capacitance SC may be formed in each of the plurality of dot electrodes Dot. The self-capacitance SC may be changed when a touch of the finger 10 is provided to the touch array 310.

Each of the plurality of dot electrodes Dot may be connected to the touch driver 320 through any one connection line among the connection lines 330.

In one or more embodiments, each of the dot electrodes Dot has a diamond shape. However, the diamond shape is merely described as an example, and may be at least one of various shapes, such as a circular shape, a quadrangular shape, or a mesh shape. Also, each of the dot electrodes Dot may be formed as a single layer or as a multi-layer. As such, the shapes and arrangements of the dot electrodes Dot may be variously modified.

In embodiments, the dot electrodes Dot may include at least one of various conductive materials, such as a metal material and a transparent conductive material, thereby having conductivity. For example, the dot electrodes Dot may include at least one of various metal materials, such as gold (Au), silver (Ag), aluminum (Al), molybdenum (Mo), chromium (Cr), titanium (Ti), nickel (Ni), neodymium (Nd), copper (Cu), or platinum (Pt), or alloys thereof.

The touch array 310 may be provided as the touch array 310 shown in FIG. 2. The touch array 310 may further include pads, in one or more embodiments. The touch driver 320 may be connected to the pads through the connection lines 330, in one or more embodiments.

The touch module 300 may transmit uplink signals to the external device 400 through the dot electrodes Dot in the third sensing mode. For example, the touch driver 320 may transmit the uplink signals to the external device 400 by applying touch-driving signals to the dot electrodes Dot through the connection lines 330.

When the external device 400 is in contact with, or adjacent to, the touch array 310, the external device 400 may receive uplink signals ULS through at least some of the dot electrodes Dot. Also, the external device 400 may calculate position information corresponding to the external device 400 on the touch array 310 by decoding the received uplink signals ULS.

The touch driver 320 may supply a self-driving signal STS to the dot electrodes Dot through the connection lines 330 in the second sensing mode. The supplied self-driving signal STS may supply charges to the self-capacitance SC formed in each of the dot electrodes Dot.

When a touch of the finger 10 is provided to the touch array 310, one or more of the self-capacitances SC may be changed.

The touch driver 320 may sense a touch by sensing a change in the self-capacitance SC formed in each of the dot electrodes Dot.

Figure 11:
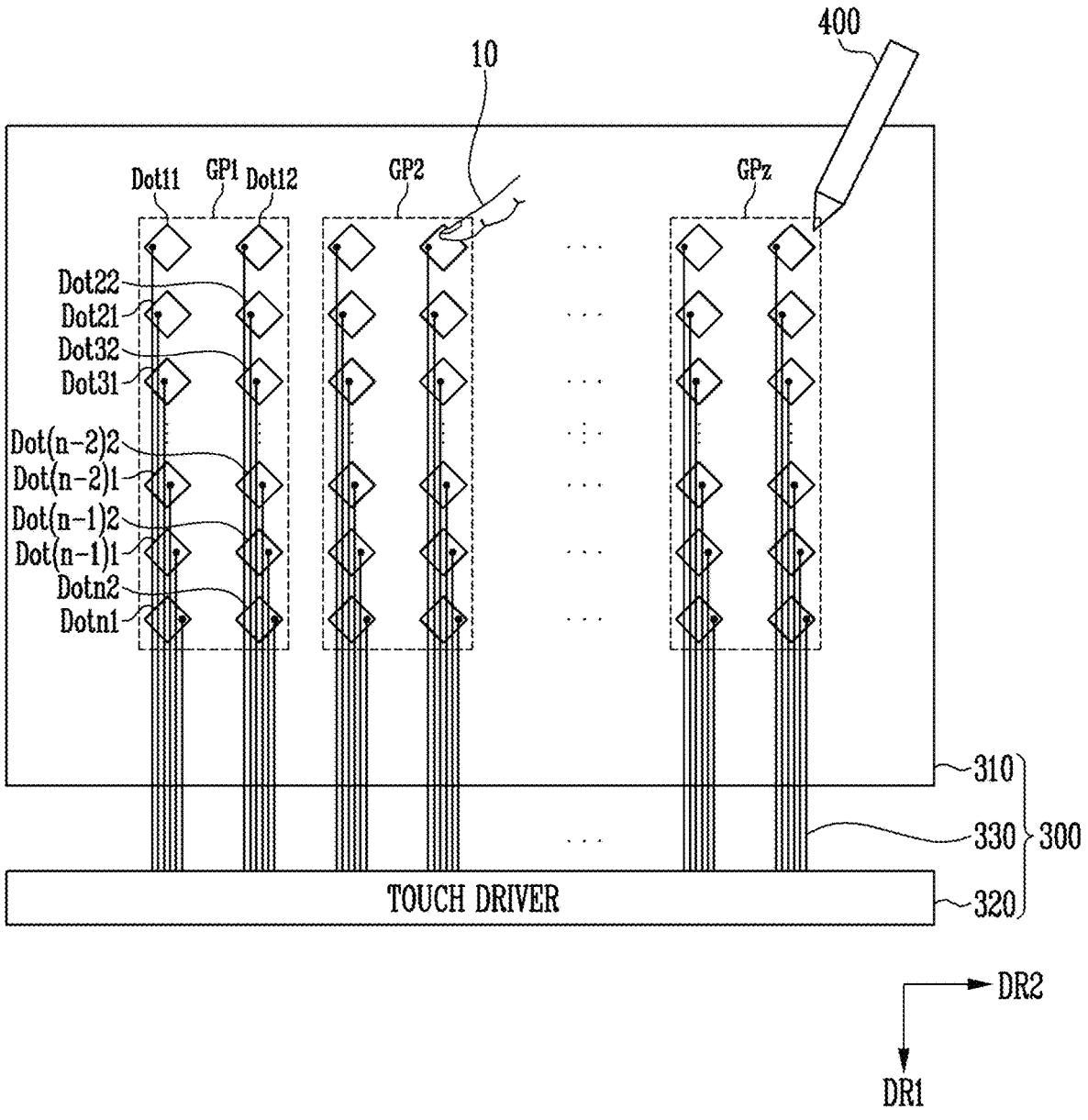
FIG. 11 is a block diagram illustrating one or more embodiments of the third sensing mode of the touch module shown in FIG. 2.

FIG. 11 is a block diagram illustrating one or more embodiments of the third sensing mode of the touch module shown in FIG. 2.

Referring to FIG. 11, the touch array 310 may include first to zth (z is a positive integer) groups GP1 to GPz.

Each of the first to zth groups GP1 to GPz may include a plurality of dot electrodes Dot. For example, the first group GP1 may include (1-1)th to (n−2)th dot electrodes Dot11 to Dotn2. However, the present disclosure is not limited as shown in FIG. 11. For example, each of the first to zth groups GP1 to GPz may include six adjacent dot electrodes Dot.

When the touch module 300 transmits uplink signals to the external device 400 through the dot electrodes Dot of the touch array 310, this may be performed for each group. For example, the touch module 300 may transmit uplink signals to the external device 400 through the (1-1)th to (n–2)th dot electrodes Dot11 to Dotn2 included in the first group GP1. Next, the touch module 300 may transmit uplink signals to the external device 400 through dot electrodes included in the second group GP2. In the same manner, the touch module 300 may perform an operation of transmitting uplink signals for each group with respect to the other dot electrodes Dot.

In addition, when the touch module 300 transmits uplink signals through dot electrodes included in any one group, the touch module 300 may sequentially transmit uplink signals to the external device 400 for each dot electrode. For example, when the touch module 300 transmits uplink signals through the (1-1)th to (n–2)th dot electrodes Dot11 to Dotn2 included in the first group GP1, first, the touch module 300 may transmit an uplink signal to the external device through the (1-1)th dot electrode Dot11. After that, the touch module 300 may transmit an uplink signal to the external device 400 through the (1-2)th dot electrode Dot12. In the same manner, the touch module 300 may perform an operation of sequentially transmitting uplink signals for each dot electrode with respect to the other (2-1)th to (n–2)th dot electrodes Dot21 to Dotn2.

Figure 12:
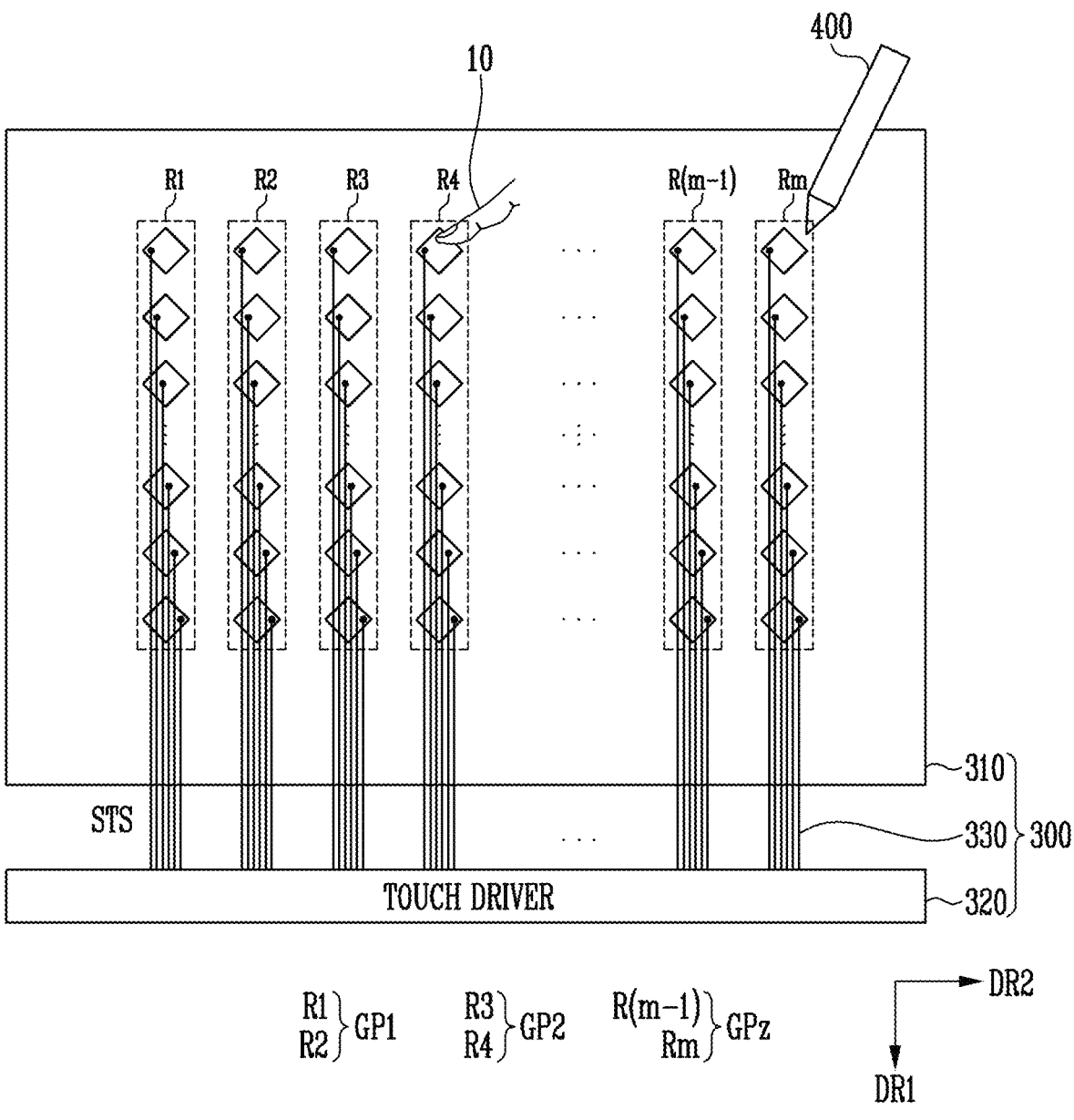
FIGS. 12 and 13 are block diagrams illustrating one or more other embodiments of the third sensing mode of the touch module shown in FIG. 2.
Figure 13:
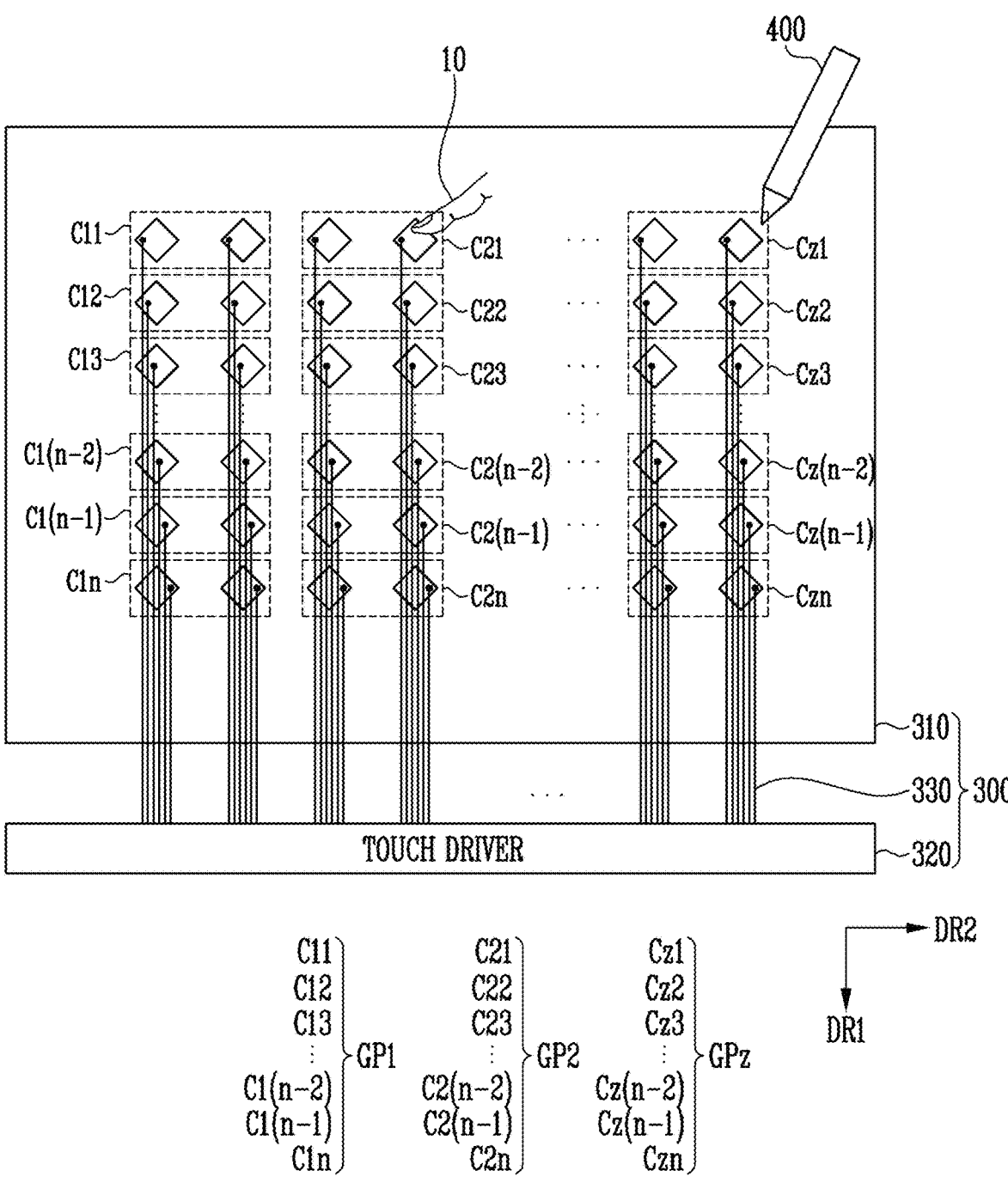

FIGS. 12 and 13 are block diagrams illustrating one or more other embodiments of the third sensing mode of the touch module shown in FIG. 2.

Referring to FIGS. 12 and 13, the touch array 310 may include first to zth (z is a positive integer) groups GP1 to GPz.

Dot electrodes included in each of the first to zth groups GP1 to GPz may be divided into a plurality of column groups. For example, referring to FIG. 12, each of dot electrodes included in the first group GP1 may be included in any one of a first column group R1 or a second column group R2. Each of the electrodes included in the second group GP2 may be included in any one of a third column group R3 or a fourth column group R4. Each of dot electrodes included in the zth group GPz may be included in any one of an (m–1)th column group R(m–1) or an mth column group Rm.

The dot electrodes included in each of the first to zth groups GP1 to GPz may be divided into a plurality of row groups. For example, referring to FIG. 13, each of the dot electrodes included in the first group GP1 may be included in any one of (1–1)th to (1–n)th row groups C11 to C1n. Each of the dot electrodes included in the second group GP2 may be included in any one of (2–1)th to (2–n)th row groups C21 to C2n. Each of the dot electrodes included in the zth group GPz may be included in any one of (z–1)th to (z–n)th row groups Cz1 to Czn.

When the touch module 300 transmits uplink signals to the external device 400 through the dot electrodes Dot of the touch array 310, this may be performed for each group. For example, the touch module 300 may transmit uplink signals to the external device 400 through the (1-1)th to (n–2)th dot electrodes Dot11 to Dotn2 included in the first group GP1. Next, the touch module 300 may transmit uplink signals to the external device 400 through the dot electrodes included in the second group GP2. In the same manner, the touch module 300 may perform an operation of transmitting uplink signals for each group with respect to the other dot electrodes Dot.

In addition, when the touch module 300 transmits uplink signals to the external device 400 through dot electrodes included in any one group, first, the touch module 300 may sequentially transmit uplink signals for each row group. After that, the touch module 300 may sequentially transmit uplink signals to the external device 400 for each column group.

A process in which the touch module 300 sequentially transmits uplink signals to the external device 400 for each row group is as follows. For example, when the touch module 300 transmits uplink signals through the dot electrodes included in the first group GP1, first, the touch module 300 may transmit uplink signals through dot electrodes included in the (1-1)th row group C11. After that, the touch module 300 may transmit uplink signals through dot electrodes included in the (1-2)th row group C12. Similarly, the touch module 300 may sequentially transmit uplink signals for each row group with respect to the other dot electrodes Dot.

A process in which the touch module 300 sequentially transmits uplink signals to the external device 400 for each column group is as follows. For example, when the touch module 300 transmits uplink signals to the external device 400 through the dot electrodes included in the first group GP1, the touch module 300 may transmit uplink signals through dot electrodes included in the first column group R1. After that, the touch module 300 may transmit uplink signals through dot electrodes included in the second column group R2.

Figure 14:
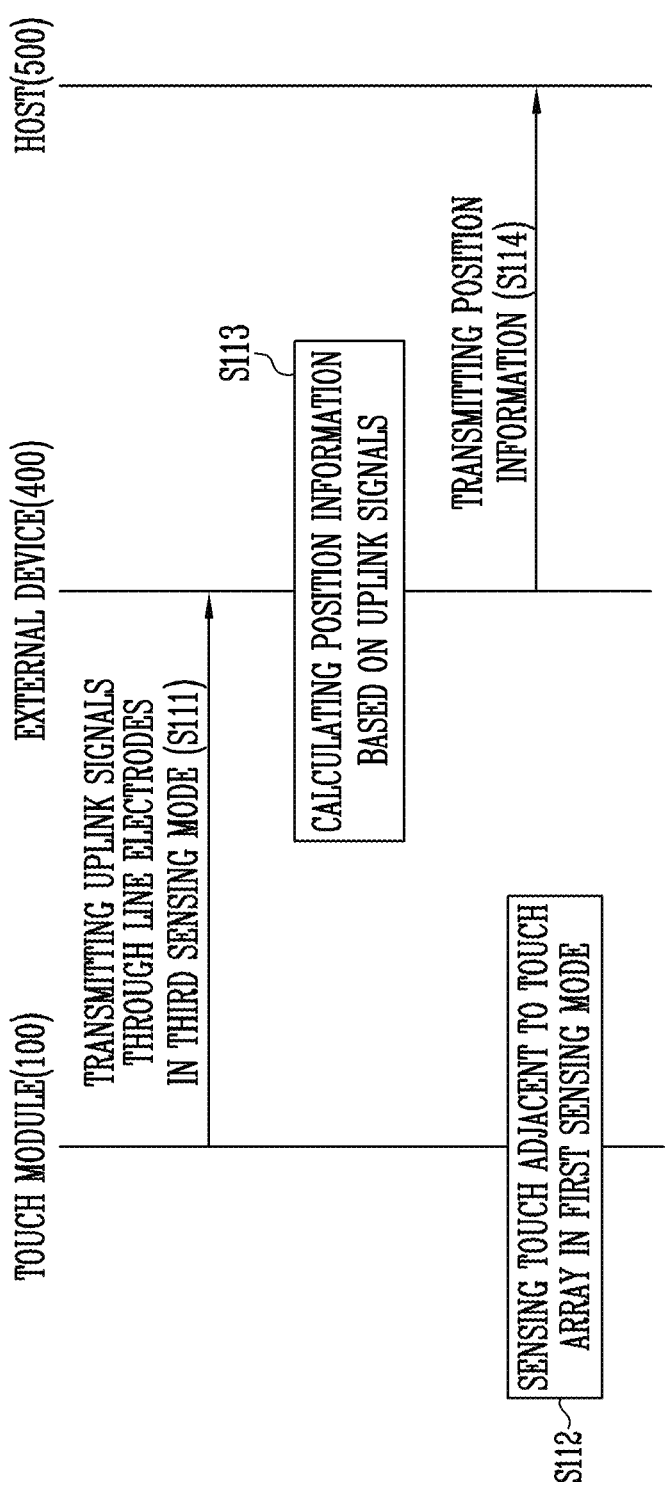
FIG. 14 is a flowchart illustrating first one or more embodiments of the display device shown in FIG. 1.

FIG. 14 is a flowchart illustrating first one or more embodiments of the display device shown in FIG. 1.

Referring to FIGS. 7, 8, and 14, the touch module 100 may perform operation S111 of transmitting uplink signals to the external device 400 through the line electrodes LE in the third sensing mode. Next, the touch module 100 may perform operation S112 of sensing a touch adjacent to the touch array 110 in the first sensing mode. Next, the external device 400 may perform operation S113 of calculating position information based on the uplink signals. Next, the external device 400 may perform operation S114 of transmitting the position information to the host 500.

In accordance with the one or more embodiments described with reference to FIG. 14, an operation of the touch module 100 in the third sensing mode and an operation of the touch module 100 in the first sensing mode are temporally separated from each other, so that a touch of the finger 10 (see FIG. 1) and a touch of the external device 400 can be concurrently or substantially simultaneously sensed.

Figure 15:
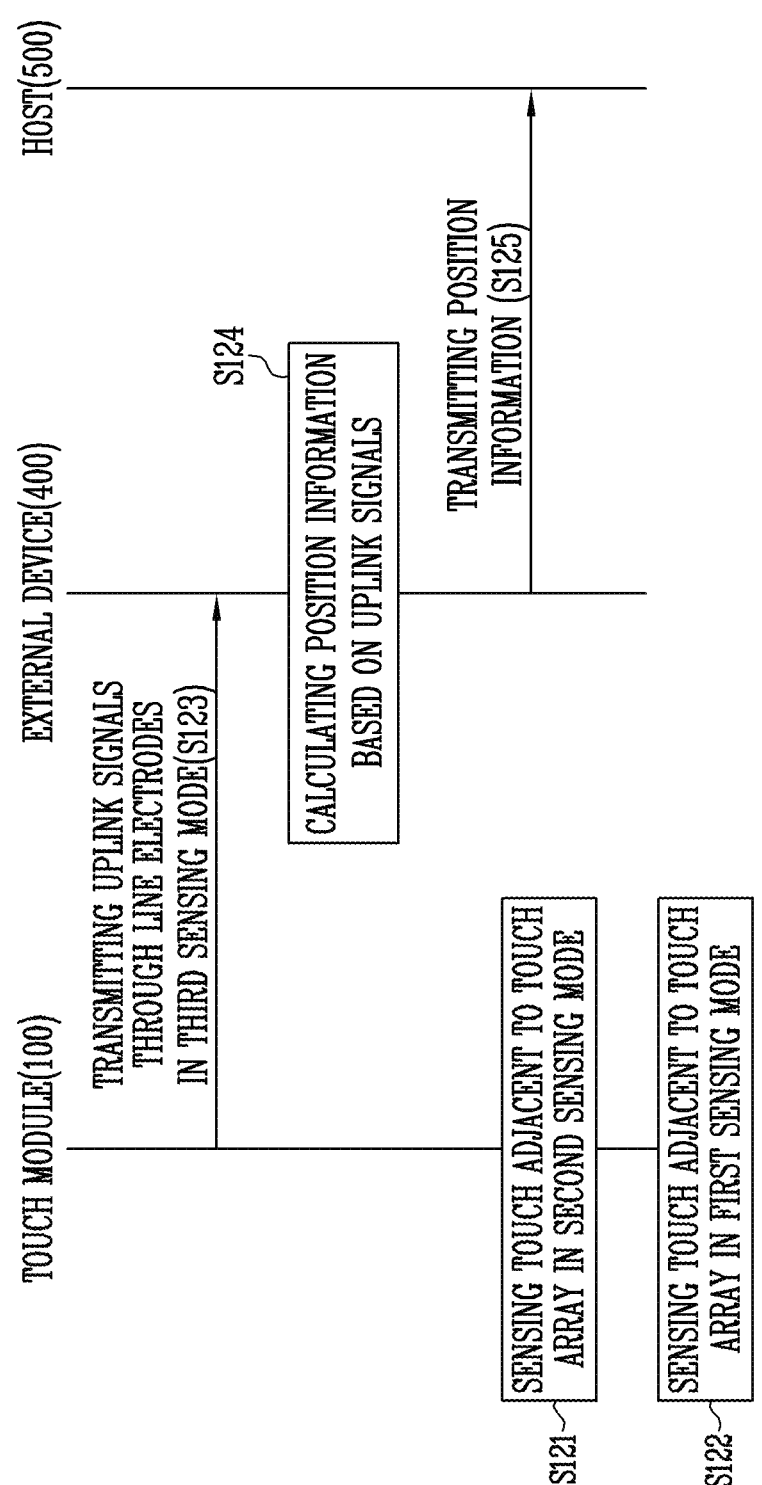
FIG. 15 is a flowchart illustrating second one or more embodiments of the display device shown in FIG. 1.

FIG. 15 is a flowchart illustrating second one or more embodiments of the display device shown in FIG. 1.

Referring to FIGS. 7 to 9 and 15, the touch module 100 may perform operation S121 of sensing a touch adjacent to the touch array 110 in the second sensing mode. Next, the touch module 100 may perform operation S122 of sensing a touch adjacent to the touch array 110 in the first sensing mode. Next, the touch module 100 may perform operation S123 of transmitting uplink signals to the external device 400 through the line electrodes LE in the third sensing mode. Next, the external device 400 may perform operation S124 of calculating position information based on the uplink signals. Next, the external device 400 may perform operation S125 of transmitting the position information to the host 500.

Figure 16:
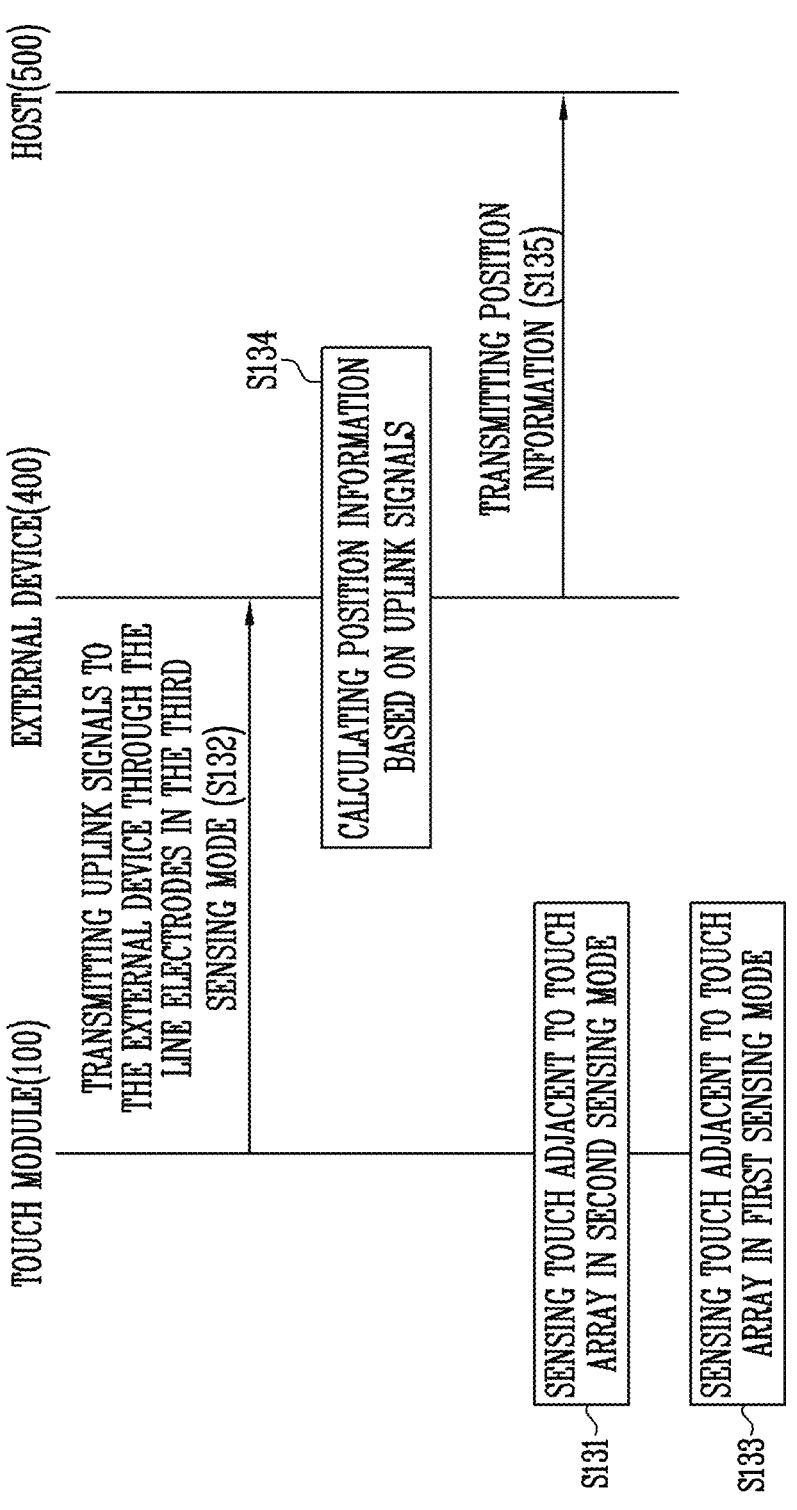
FIG. 16 is a flowchart illustrating third one or more embodiments of the display device shown in FIG. 1.

FIG. 16 is a flowchart illustrating third one or more embodiments of the display device shown in FIG. 1.

Referring to FIGS. 7 to 9 and 16, the touch module 100 may perform operation S131 of sensing a touch adjacent to the touch array 110 in the second sensing mode. Next, the touch module 100 may perform operation S132 of transmitting uplink signals to the external device through the line electrodes LE in the third sensing mode. Next, the touch module 100 may perform operation S133 of sensing a touch adjacent to the touch array 110 in the first sensing mode. Next, the external device 400 may perform operation S134 of calculating position information based on the uplink signals. Next, the external device 400 may perform operation S135 of transmitting the position information to the host 500.

Figure 17:
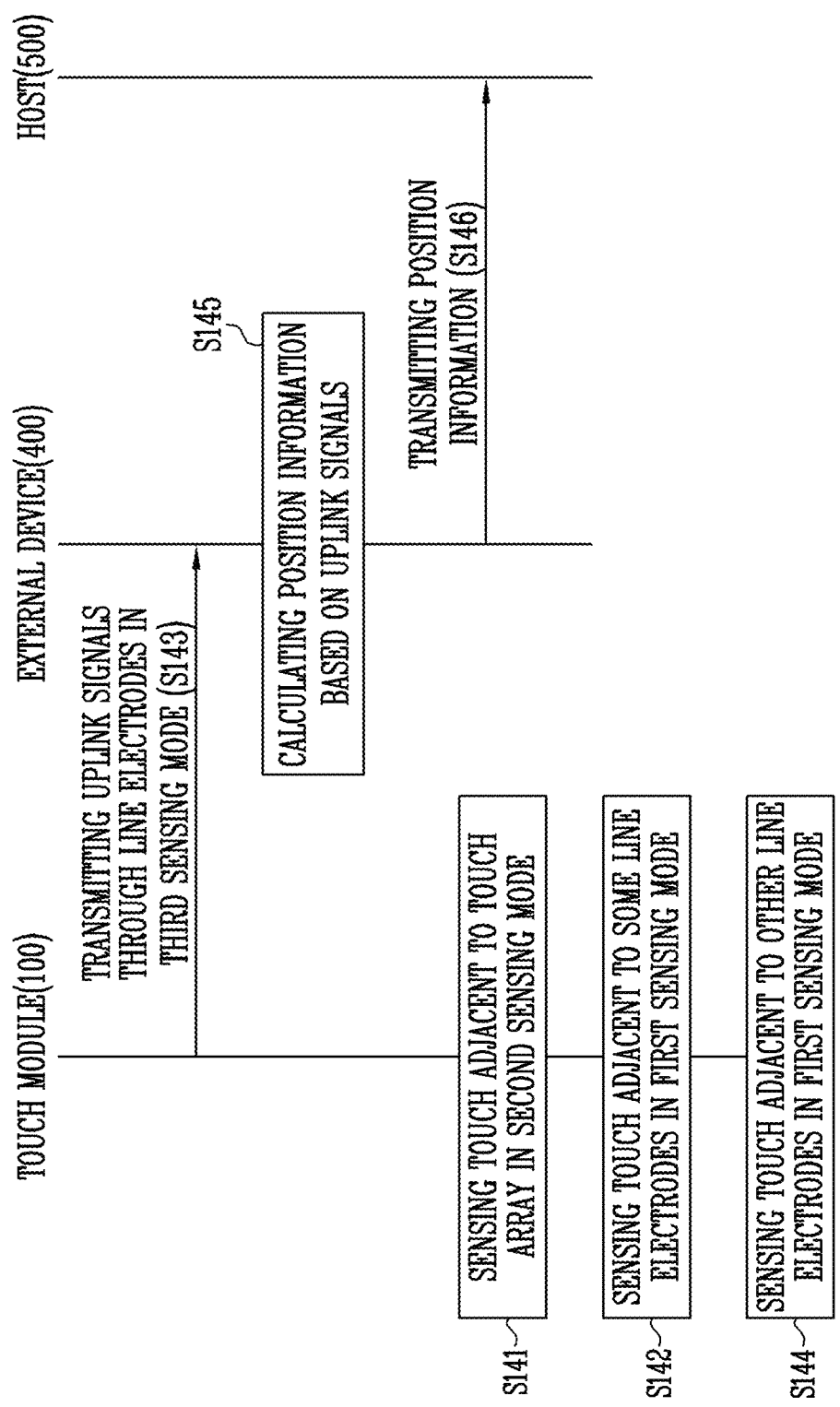
FIG. 17 is a flowchart illustrating fourth one or more embodiments of the display device shown in FIG. 1.

FIG. 17 is a flowchart illustrating fourth one or more embodiments of the display device shown in FIG. 1.

Referring to FIGS. 7 to 9 and 17, the touch module 100 may perform operation S141 of sensing a touch adjacent to the touch array 110 in the second sensing mode. Next, the touch module 100 may perform operation S142 of sensing a touch adjacent to some line electrodes among the line electrodes LE of the touch array 110 in the first sensing mode. Next, the touch module 100 may perform operation S143 of transmitting uplink signals to the external device 400 through the line electrodes LE in the third sensing mode. Next, the touch module 100 may perform operation S144 of sensing a touch adjacent to the other line electrodes among the line electrodes LE in the first sensing mode. Next, the external device 400 may perform operation S145 of calculating position information based on the uplink signals. Next, the external device 400 may perform operation S146 of transmitting the position information to the host 500.

In accordance with the embodiments described with reference to FIGS. 15 to 17, an operation of the touch module 100 in the third sensing mode and operations of the touch module 100 in the first and second sensing modes are temporally separated from each other, so that a touch of the finger 10 (see FIG. 1) and a touch of the external device 400 can be concurrently or substantially simultaneously sensed.

Figure 18:
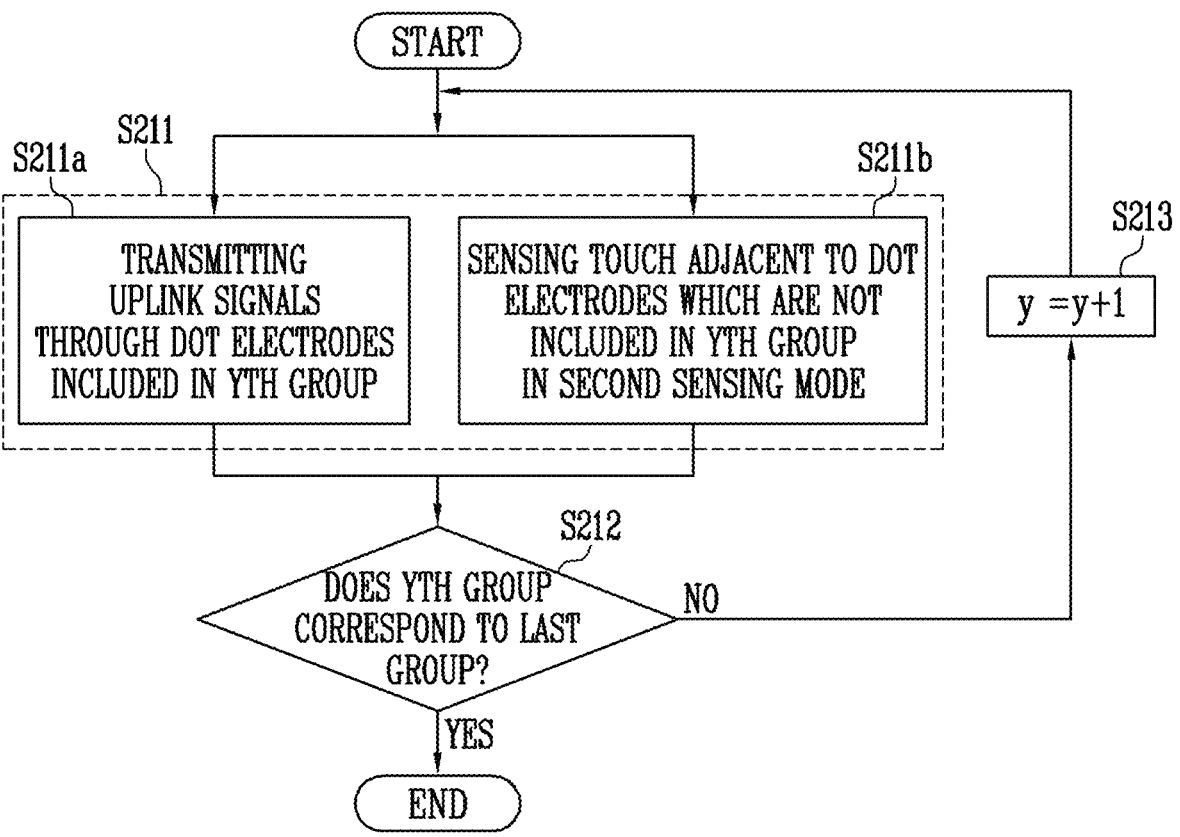
FIG. 18 is a flowchart illustrating first one or more embodiments of the display device shown in FIG. 2.

FIG. 18 is a flowchart illustrating first one or more embodiments of the display device shown in FIG. 2.

Referring to FIGS. 10 to 13 and 18, the touch module 300 may perform operation S211a of transmitting uplink signals to the external device 400 through dot electrodes included in a yth (y is an integer that is 1 or more and z or less) group GPy. At the same time, the touch module 300 may perform operation S211b of sensing a touch adjacent to dot electrodes, which are not included in the yth group GPy, in the second sensing mode. Operation S211a may be performed according to any one of the method described with reference to FIG. 11 or the method described with reference to FIGS. 12 and 13.

The touch module 300 may perform operation S212 of determining whether the yth group GPy corresponds to a last group. When the yth group GPy corresponds to the last group, a sensing operation of the touch module 300 may end.

When the yth group GPy does not correspond to the last group, a (y+1)th group GP (y+1) as a next group may be selected as the yth group GPy in operation S213. Subsequently, operations S211 and S212 may be re-performed.

In accordance with the one or more embodiments described with reference to FIG. 18, an operation of the touch module 300 in the third sensing mode and an operation of the touch module 300 in the second sensing mode can be concurrently or substantially simultaneously performed by varying an area of the touch array 310. A touch of the finger 10 (see FIG. 2) and a touch of the external device 400 can be concurrently or substantially simultaneously sensed.

Figure 19:
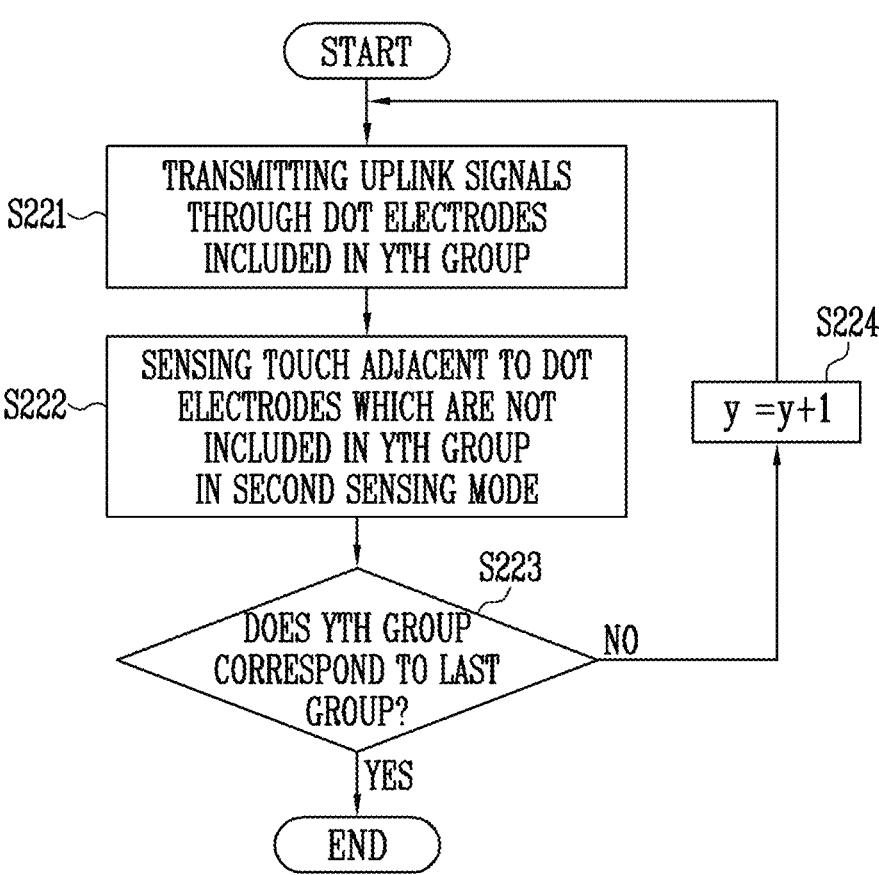
FIG. 19 is a flowchart illustrating second one or more embodiments of the display device shown in FIG. 2.

FIG. 19 is a flowchart illustrating second one or more embodiments of the display device shown in FIG. 2.

Referring to FIGS. 10 to 13 and 19, the touch module 300 may perform operation S221 of transmitting uplink signals to the external device 400 through dot electrodes included in a yth (y is an integer that is 1 or more and z or less) group GPy. Next, the touch module 300 may perform operation S222 of sensing a touch adjacent to dot electrodes, which are not included in the yth group GPy, in the second sensing mode. When operation S221 is performed, operation S221 may be performed according to any one of the method described with reference to FIG. 11 or the method described with reference to FIGS. 12 and 13.

The touch module 300 may perform operation S223 of determining whether the yth group GPy corresponds to a last group. When the yth group GPy corresponds to the last group, a sensing operation of the touch module 300 may end.

When the yth group GPy does not correspond to the last group, a (y+1)th group GP (y+1) as a next group may be selected as the yth group GPy in operation S224. Subsequently, operations S221, S22, and S223 may be re-performed.

Figure 20:
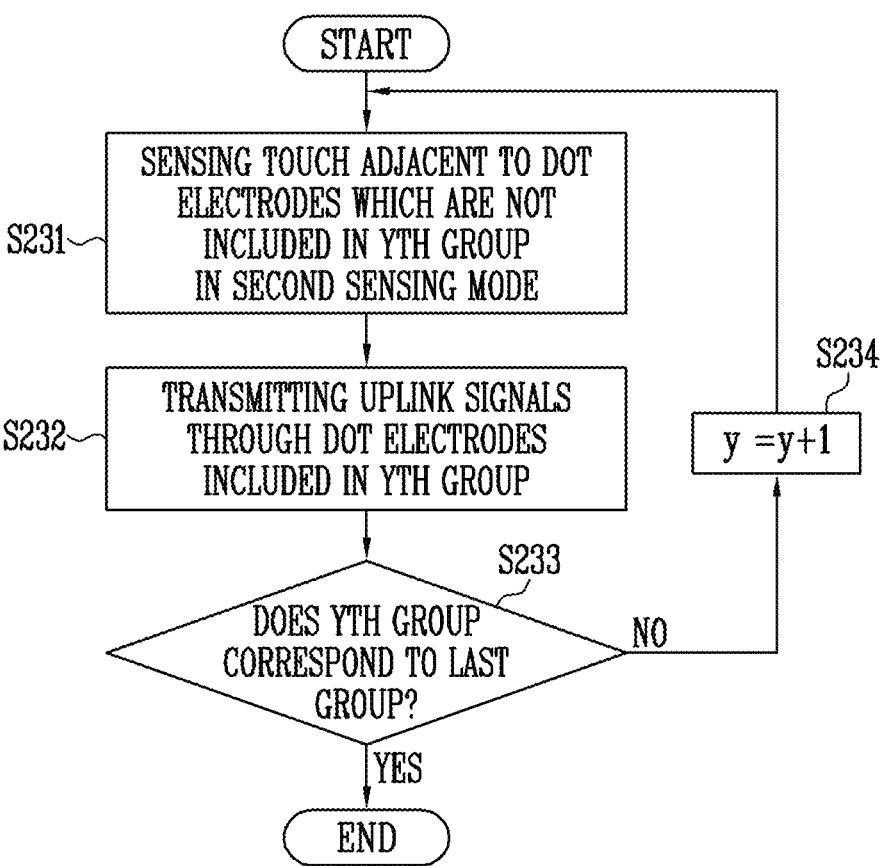
FIG. 20 is a flowchart illustrating third one or more embodiments of the display device shown in FIG. 2.

FIG. 20 is a flowchart illustrating third one or more embodiments of the display device shown in FIG. 2.

Referring to FIGS. 10 to 13 and 20, the touch module 300 may perform operation S231 of sensing a touch adjacent to dot electrodes, which are not included in a yth (y is an integer that is 1 or more and z or less) group GPy, in the second sensing mode. The touch module 300 may perform operation S232 of transmitting uplink signals to the external device 400 through dot electrodes included in the yth group GPy. Operation S232 may be performed according to any one of the method described with reference to FIG. 11 or the method described with reference to FIGS. 12 and 13.

The touch module 300 may perform S233 of determining whether the yth group GPy corresponds to a last group. When the yth group GPy corresponds to the last group, a sensing operation of the touch module 300 may end.

When the yth group GPy does not correspond to the last group, a (y+1)th group GP (y+1) as a next group may be selected as the yth group GPy in operation S234. Subsequently, operations S231, S22, and S233 may be re-performed.

Figure 21:
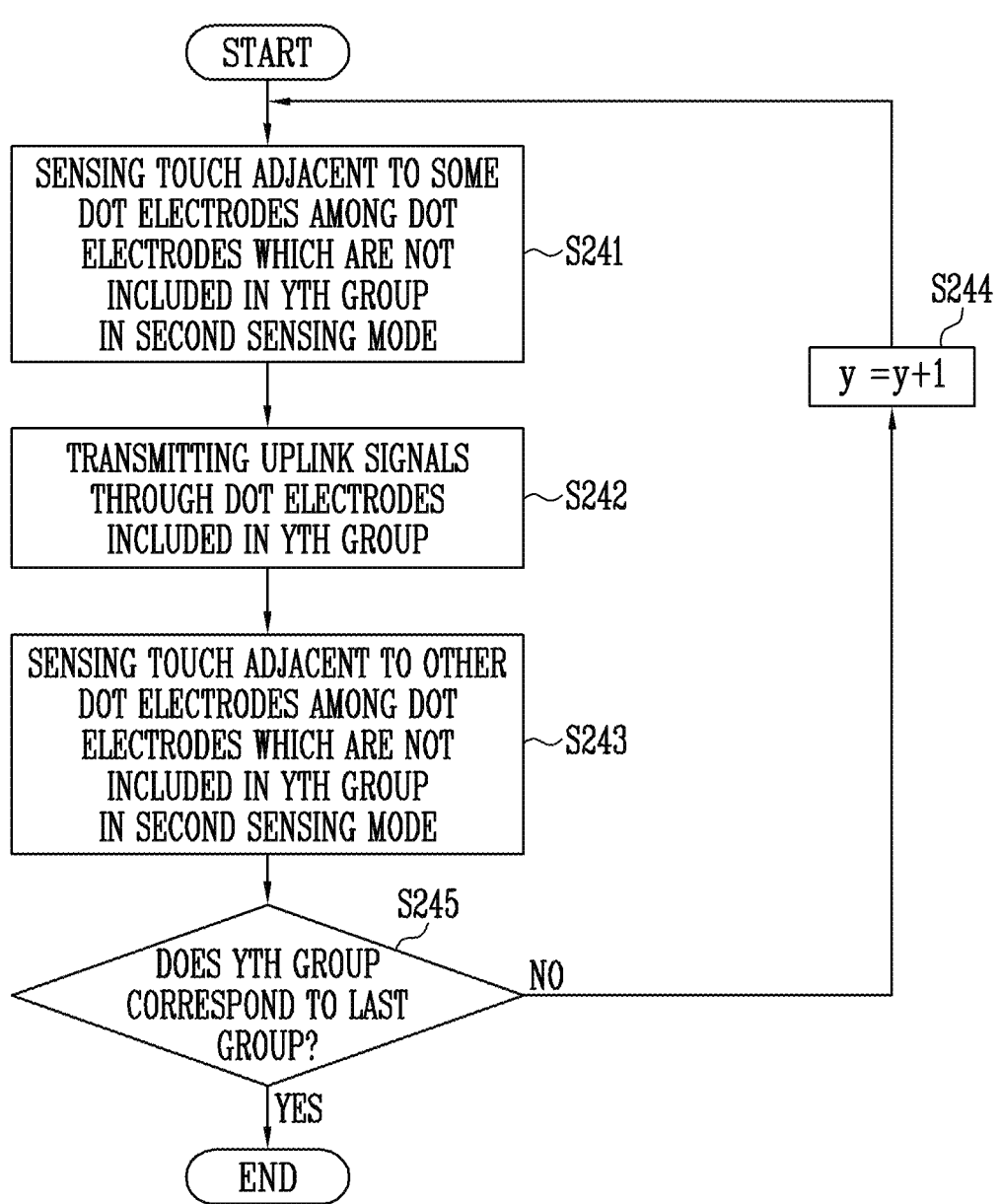
FIG. 21 is a flowchart illustrating fourth one or more embodiments of the display device shown in FIG. 2.

FIG. 21 is a flowchart illustrating fourth one or more embodiments of the display device shown in FIG. 2.

Referring to FIGS. 10 to 13 and 21, the touch module 300 may perform operation S241 of sensing a touch adjacent to some dot electrodes among dot electrodes, which are not included in a yth (y is an integer which is 1 or more and z or less) group GPy, in the second sensing mode. The touch module 300 may perform operation S242 of transmitting uplink signals to the external device 400 through dot electrodes included in the yth group GPy. The touch module 300 may perform operation S243 of sensing a touch adjacent to the other dot electrodes among the dot electrodes that are not included in the yth group GPy. When operation S242 is performed, operation S242 may be performed according to any one of the method described with reference to FIG. 11 or the method described with reference to FIGS. 12 and 13.

The touch module 300 may perform operation S245 of determining whether the yth group GPy corresponds to a last group. When the yth group GPy corresponds to the last group, a sensing operation of the touch module 300 may end.

When the yth group GPy does not correspond to the last group, a (y+1)th group GP (y+1) as a next group may be selected as the yth group GPy in operation S244. Subsequently, operations S241, S242, S243, and S245 may be re-performed.

In accordance with the embodiments described with reference to FIGS. 19 to 21, an operation of the touch module 300 in the third sensing mode and an operation of the touch module 300 in the second sensing mode can be performed in different time periods by varying an area of the touch array 310. A touch of the finger 10 (see FIG. 2) and a touch of the external device 400 can be concurrently or substantially simultaneously sensed.

In the display device in accordance with the present disclosure, there can be provided a display device capable of concurrently or substantially simultaneously sensing touches of a finger, an active pen, and the like with improved reliability, and a driving method of the display device.

In the display device in accordance with the present disclosure, touch-driving signals are provided to first touch electrodes located in an area in which a touch is detected in the second mode, so that the touch report rate can become high, and the response speed to a touch can be increased.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, aspects, characteristics, and/or elements described in connection with a particular embodiment may be used singly or in combination with aspects, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A display device comprising:
a touch array comprising:
driving electrodes that extend in a first direction, and that are arranged in a second direction crossing the first direction; and
sensing electrodes that extend in the second direction, and that are arranged in the first direction; and
a touch driver configured to:
transmit uplink signals to an external device adjacent to the touch array through the driving electrodes and the sensing electrodes in a third sensing mode;
sense a touch by applying a mutual driving signal to the touch array in a first sensing mode, the external device being configured to calculate position information by decoding the uplink signals;
supply charges to self-capacitances respectively formed in the driving electrodes and the sensing electrodes by applying a self-driving signal to the driving electrodes and the sensing electrodes in a second sensing mode;
sense a touch adjacent to first areas of the touch array to the exclusion of second areas of the touch array in the first sensing mode; and
sense a touch adjacent to the second areas of the touch array to the exclusion of the first areas in the first sensing mode,
wherein the touch driver is configured to sequentially sense the touch adjacent to the touch array in the second sensing mode, sense the touch adjacent to the first areas of the touch array in the first sensing mode, transmit the uplink signals through the touch array in the third sensing mode, and sense the touch adjacent to the second areas of the touch array in the first sensing mode.

2. The display device of claim 1, wherein a mutual capacitance is formed between an adjacent pair of one of the driving electrodes and one of the sensing electrodes, and
wherein the touch driver is further configured to apply the mutual driving signal to the driving electrodes in the first sensing mode, and to sense a change in the mutual capacitance through a mutual sensing signal received from the sensing electrodes.

3. The display device of claim 1, wherein the touch driver is further configured to sense a change in the self-capacitances.

4. The display device of claim 3, wherein a period in which the touch driver is configured to transmit the uplink signals in the third sensing mode, a period in which the touch driver is configured to sense the touch in the first sensing mode, and a period in which the touch driver is configured to sense the touch in the second sensing mode, are different from one another.

5. A method of driving a display device comprising a touch array comprising driving electrodes extending in a first direction and arranged in a second direction crossing the first direction, and sensing electrodes extending in the second direction and arranged in the first direction, the method comprising:
transmitting uplink signals to an external device adjacent to the touch array in a third sensing mode such that the external device calculates position information using the uplink signals;
sensing a touch adjacent to the touch array by applying a mutual driving signal to first ones of the driving electrodes to the exclusion of second ones of the driving electrodes, and subsequently applying the mutual driving signal to the second ones of the driving electrodes to the exclusion of the first ones of the driving electrodes, in a first sensing mode;
sensing a touch adjacent to the touch array by applying a self-driving signal to the driving electrodes and to the sensing electrodes in a second sensing mode;
sensing a touch adjacent to first areas of the touch array to the exclusion of second areas of the touch array in the first sensing mode; and
sensing a touch adjacent to the second areas of the touch array to the exclusion of the first areas in the first sensing mode,
wherein the sensing the touch adjacent to the touch array in the second sensing mode, the sensing the touch adjacent to the first areas of the touch array in the first sensing mode, the transmitting the uplink signals through the touch array in the third sensing mode, and the sensing the touch adjacent to the second areas of the touch array in the first sensing mode are sequentially performed.

6. The method of claim 5, further comprising forming a mutual capacitance between an adjacent pair of one of the driving electrodes and one of the sensing electrodes, and
wherein the sensing the touch adjacent to the touch array in the first sensing mode comprises:
applying the mutual driving signal to the driving electrodes;
receiving a mutual sensing signal from the sensing electrodes; and
sensing a change in the mutual capacitance through the mutual sensing signal.

7. The method of claim 5, wherein the sensing the touch adjacent to the touch array in the second sensing mode, the sensing the touch adjacent to the touch array in the first sensing mode, and the transmitting the uplink signals through the touch array in the third sensing mode are sequentially performed.

8. The method of claim 5, wherein the sensing the touch adjacent to the touch array in the second sensing mode, the transmitting the uplink signals through the touch array in the third sensing mode, and the sensing the touch adjacent to the touch array in the first sensing mode are sequentially performed.

9. A method of driving a display device comprising a touch array comprising dot electrodes comprising first to zth groups arranged in a first direction and in a second direction crossing the first direction, and not overlapping each other, the method comprising:

transmitting uplink signals through the touch array in a third sensing mode such that an external device adjacent to the touch array is configured to calculate position information using the uplink signals;

sensing a touch adjacent to the touch array by applying a self-driving signal to the dot electrodes in a second sensing mode; and sequentially:

sensing a touch adjacent to a first plurality of the dot electrodes of the second to zth groups in the second sensing mode;

transmitting the uplink signals through the dot electrodes of the first group in the third sensing mode; and sensing a touch adjacent to a second plurality of the dot electrodes of the second to zth groups, which is different from the first plurality of the dot electrodes, in the second sensing mode, wherein z is a positive integer.

10. The method of claim 9, further comprising forming a self-capacitance in the dot electrodes, wherein the sensing the touch adjacent to the touch array in the second sensing mode comprises:

supplying charges to the self-capacitance of the dot electrodes by applying the self-driving signal to the dot electrodes; and sensing a change in the self-capacitance of the dot electrodes.

11. The method of claim 9, further comprising concurrently or substantially simultaneously:

transmitting the uplink signals through the dot electrodes of the first group in the third sensing mode; and sensing a touch adjacent to dot electrodes of the second to zth groups in the second sensing mode.

12. The method of claim 11, wherein the transmitting the uplink signals through the dot electrodes of the first group in the third sensing mode comprises:

separating the dot electrodes of the first group into row groups;

sequentially transmitting the uplink signals for the row groups;

separating the dot electrodes of the first group into column groups; and sequentially transmitting the uplink signals for the column groups.

13. The method of claim 9, further comprising sequentially:

transmitting the uplink signals through the dot electrodes of the first group in the third sensing mode; and sensing a touch adjacent to dot electrodes of the second to zth groups in the second sensing mode.

14. The method of claim 13, wherein the transmitting the uplink signals through the dot electrodes of the first group in the third sensing mode comprises:

separating the dot electrodes of the first group into row groups;

sequentially transmitting the uplink signals for the row groups;

separating the dot electrodes of the first group into column groups; and sequentially transmitting the uplink signals for the column groups.

15. The method of claim 9, further comprising sequentially:

sensing a touch adjacent to the dot electrodes of the second to zth groups in the second sensing mode; and transmitting the uplink signals through the dot electrodes of the first group in the third sensing mode.

16. The method of claim 15, wherein the transmitting the uplink signals through the dot electrodes of the first group in the third sensing mode comprises:

separating the dot electrodes of the first group into row groups;

sequentially transmitting the uplink signals for the row groups;

separating the dot electrodes of the first group into column groups; and sequentially transmitting the uplink signals for the column groups.

17. The method of claim 9, wherein the transmitting the uplink signals through the dot electrodes of the first group in the third sensing mode comprises:

separating the dot electrodes of the first group into row groups;

sequentially transmitting the uplink signals for the row groups;

separating the dot electrodes of the first group into column groups; and sequentially transmitting the uplink signals for the column groups.

* * * * *